(12) United States Patent
Omari et al.

(10) Patent No.: US 11,521,371 B2
(45) Date of Patent: Dec. 6, 2022

(54) SYSTEMS AND METHODS FOR SEMANTIC MAP-BASED ADAPTIVE AUTO-EXPOSURE

(71) Applicant: Woven Planet North America, Inc., Los Altos, CA (US)

(72) Inventors: Sammy Omari, Los Altos, CA (US); Luc Vincent, Palo Alto, CA (US)

(73) Assignee: Woven Planet North America, Inc., Los Altos, CA (US)

(*) Notice: Subject to any disclaimer, the term of this patent is extended or adjusted under 35 U.S.C. 154(b) by 352 days.

(21) Appl. No.: 16/727,710

(22) Filed: Dec. 26, 2019

(65) Prior Publication Data

US 2021/0201070 A1 Jul. 1, 2021

(51) Int. Cl.
| | | |
|---|---|---|
| *G06V 10/75* | (2022.01) | |
| *G06N 20/00* | (2019.01) | |
| *G01C 21/36* | (2006.01) | |
| *G06F 16/29* | (2019.01) | |
| *G06V 20/58* | (2022.01) | |

(52) U.S. Cl.
CPC ........ *G06V 10/758* (2022.01); *G01C 21/3635* (2013.01); *G01C 21/3647* (2013.01); *G06F 16/29* (2019.01); *G06N 20/00* (2019.01); *G06V 10/751* (2022.01); *G06V 20/58* (2022.01)

(58) Field of Classification Search
CPC .... G06V 10/758; G06V 10/751; G06V 20/58; G06V 2201/12; G01C 21/3635; G01C 21/3647; G01C 21/3602; G06F 16/29; G06N 20/00

See application file for complete search history.

(56) References Cited

U.S. PATENT DOCUMENTS

| | | | |
|---|---|---|---|
| 10,334,180 B1* | 6/2019 | Asano | G02B 27/281 |
| 10,783,792 B1* | 9/2020 | Price | G08G 1/205 |
| 2012/0250988 A1* | 10/2012 | Peng | G06T 5/40 |
| | | | 382/165 |

(Continued)

FOREIGN PATENT DOCUMENTS

| | | |
|---|---|---|
| JP | 2000-230805 A | 8/2000 |
| KR | 10-2012-0000373 A | 1/2012 |

OTHER PUBLICATIONS

International Search Report and Written Opinion for International Application No. PCT/US2020/066480, dated Apr. 2, 2021.

*Primary Examiner* — Ming Y Hon
(74) *Attorney, Agent, or Firm* — Christopher G. Darrow; Darrow Mustafa PC

(57) ABSTRACT

In one embodiment, a method includes receiving sensor data of an environment of the vehicle generated by one or more sensors of the vehicle, the sensors comprising a camera, identifying, based on the sensor data, one or more objects in a field of view of the camera and one or more object types that correspond to the one or more objects, determining one or more target histograms that correspond to the object types, generating a processed image based on an image captured by the camera, wherein the processed image has a histogram based on the target histograms, and using the processed image to determine state information associated with the objects. The processed image may be generated by processing the image captured by the camera using a histogram matching algorithm to generate the histogram of the processed image based on the target histograms.

20 Claims, 13 Drawing Sheets

(56) References Cited

U.S. PATENT DOCUMENTS

| | | |
|---|---|---|
| 2012/0288197 A1 | 11/2012 | Adachi |
| 2017/0174227 A1* | 6/2017 | Tatourian ............. G05D 1/0088 |
| 2018/0330526 A1* | 11/2018 | Corcoran ............... H04N 7/181 |
| 2019/0050648 A1* | 2/2019 | Stojanovic ............. G06V 20/13 |
| 2021/0239809 A1* | 8/2021 | Jang ...................... G01S 17/931 |
| 2022/0044477 A1* | 2/2022 | Takama .................. G06T 17/20 |

* cited by examiner

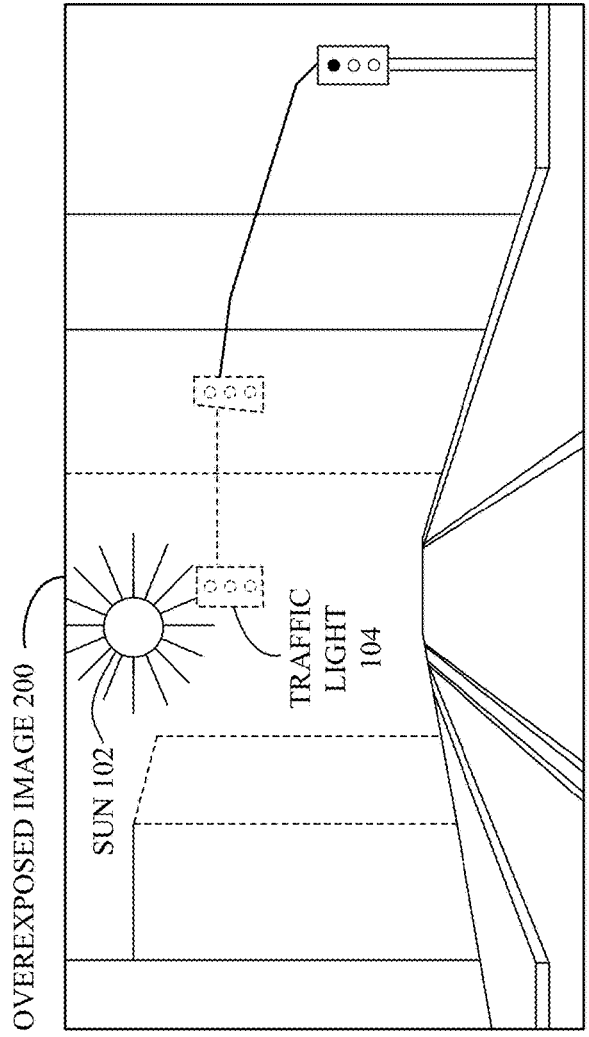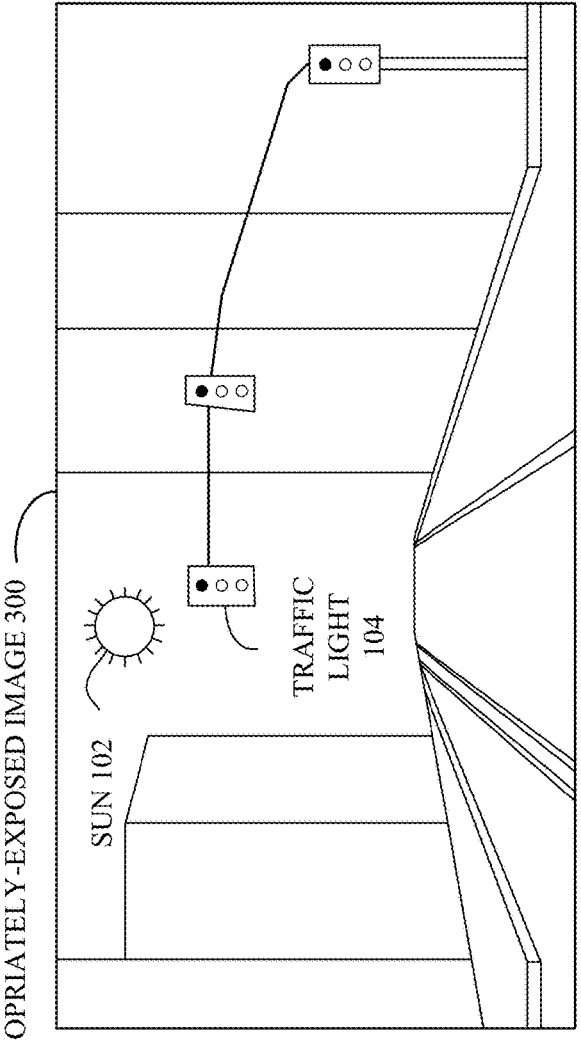

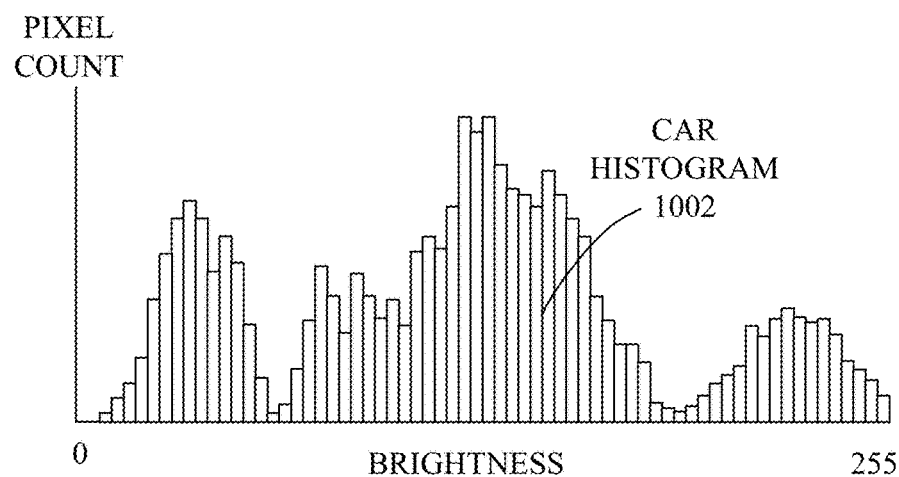
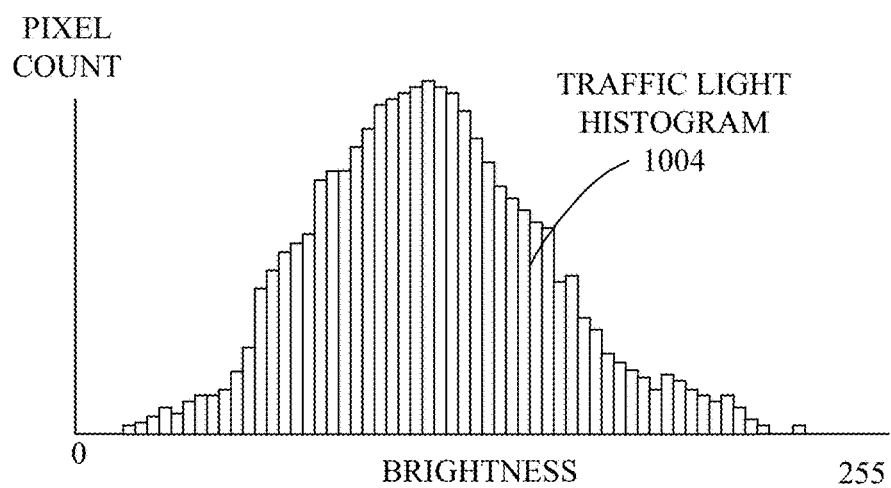
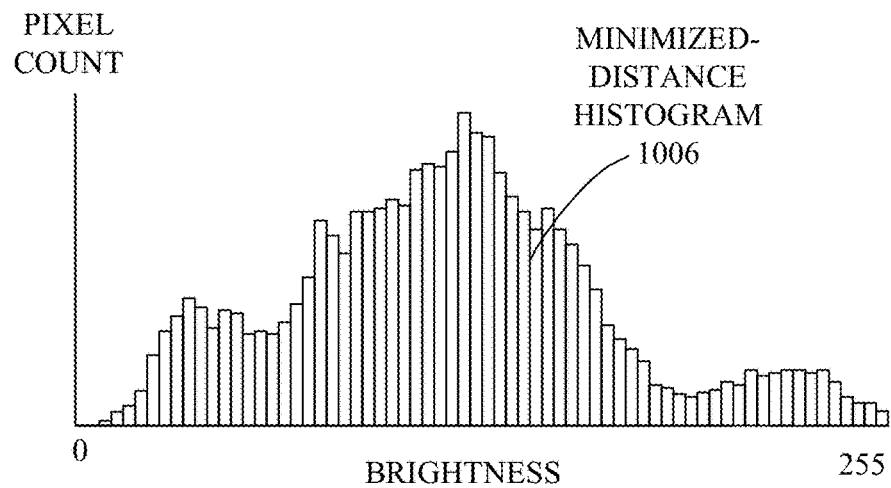
FIG. 10

SYSTEMS AND METHODS FOR SEMANTIC MAP-BASED ADAPTIVE AUTO-EXPOSURE

BACKGROUND

A modern vehicle may include one or more sensors or sensing systems for monitoring the vehicle and environment. For example, the vehicle may use speed sensors to measure the vehicle speed and may use a GPS to track the location of the vehicle. One or more cameras or LiDAR may be used to detect objects in the environment surrounding the vehicle. The cameras may capture images in accordance with exposure settings, which may control how much light reaches the camera sensor when capturing images. For example, the exposure settings may be determined by the amount of light in the environment. The vehicle may use one or more computing systems (e.g., an on-board computer) to collect and process data from the sensors. The computing systems may store the collected data in on-board storage space or upload the data to a cloud using a wireless connection. Map data, such as the locations of roads and information associated with the roads, such as lane and speed limit information, may also be stored in on-board storage space and/or received from the cloud using the wireless connection.

The computing systems may perform processing tasks on the map data, the collected data, and other information, such as a specified destination, to operate the vehicle. The computing systems may determine a target speed and heading for the vehicle, and operations, such as speeding up or slowing down, to cause the vehicle to travel at the target speed. The target speed may be determined based on speed limits encoded in the map data, a desired comfort level, and obstacles. The vehicle may adjust the target speed as the vehicle approaches obstacles. However, as the environment becomes more complex, e.g., a pedestrian is about to cross a crosswalk, and the vehicle has to stop, determining the target speed becomes more difficult. As the number of obstacles in the environment increases, the probability of multiple obstacles entering the vehicle's increases, and determining the target speed becomes more complex.

BRIEF DESCRIPTION OF THE DRAWINGS

FIG. 2 illustrates an example overexposed image.

FIG. 3 illustrates an example appropriately-exposed image.

FIG. 10 illustrates an example minimized-distance histogram for which a distance measure has been minimized across a plurality of histograms.

DESCRIPTION OF EXAMPLE EMBODIMENTS

Figure 1A:
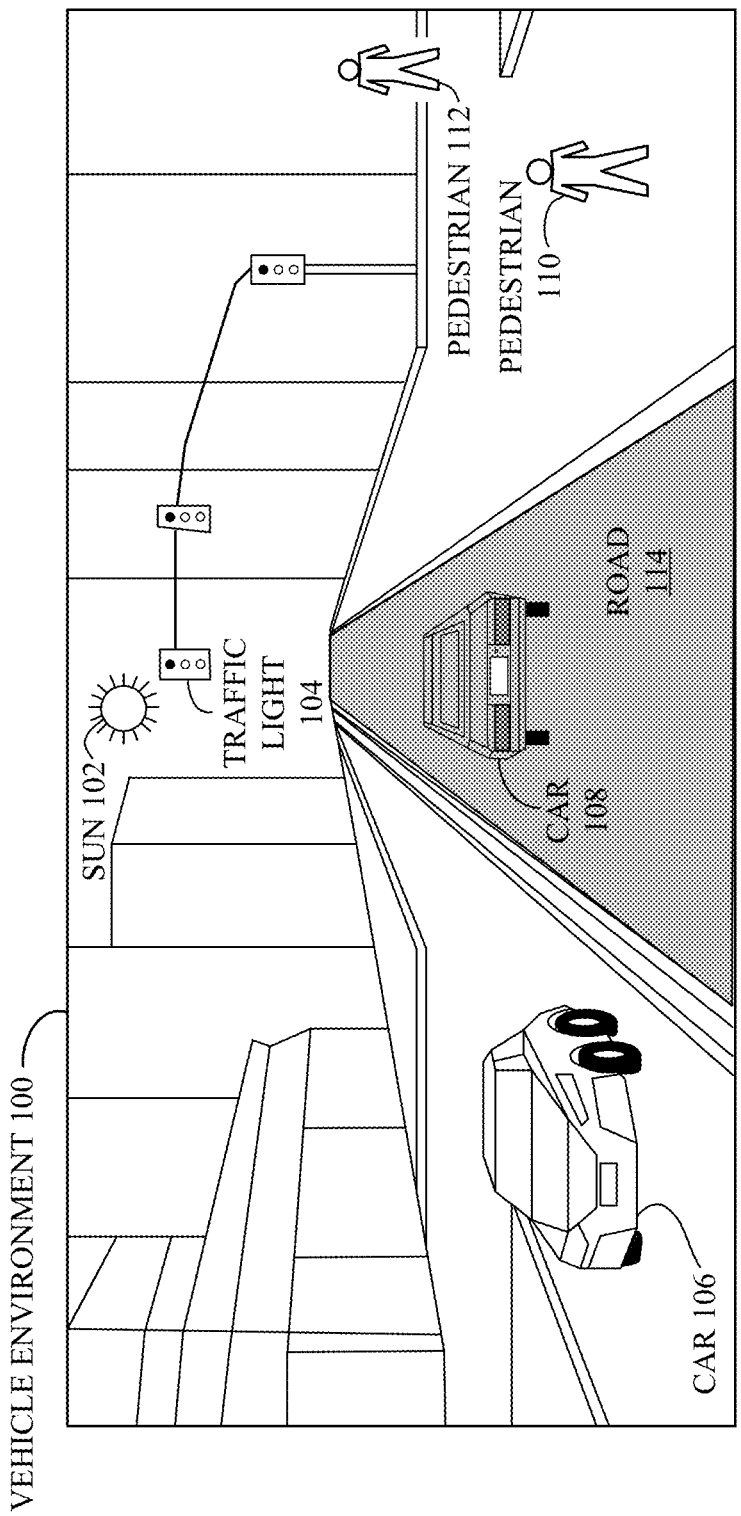
FIG. 1A illustrates an example vehicle environment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Light-sensitive sensors, such as cameras, are used in vehicles to generate images of a vehicle environment, and the images may be used to make decisions related to operation of the vehicle. Particular regions of an image may depict objects of interest, such as other vehicles, pedestrians, and traffic lights. The quality of the image, e.g., details, sharpness, and brightness, depends at least in part on camera exposure settings, which control the amount of light that reaches the camera sensor. Cameras can determine the exposure settings automatically using "auto exposure" features, which attempt to automatically determine the exposure settings (e.g., shutter speed, aperture, ISO) based on light measured within a frame. However, auto exposure may produce poor image quality for the objects of interest in certain situations, e.g., when some areas of the scene are much brighter than others. If an object of interest is next to a bright light, for example, the object may be very dim and difficult to detect in the image. This problem is caused by the auto exposure feature reducing the camera's sensitivity in response to the bright light. The reduced sensitivity may be insufficient to capture the object of interest. As a result, the object of interest may go undetected, or be incorrectly processed by the vehicle's computer-vision system.

In particular embodiments, a vehicle system can automatically determine appropriate camera exposure configurations for use in capturing and processing images of the vehicle's environment. The vehicle system may use sensor data to identify its location in the environment (also called "localization" or the vehicle "localizing") and the locations of detected objects in the environment. The vehicle system may then identify the appropriate exposure configurations for the particular types of objects in a field of view of one or more of the vehicle's cameras, and apply the exposure configurations to images captured by the cameras. If an image contains multiple objects, the objects may be prioritized based on their types, placement, or relevance to the vehicle so that higher-priority objects have more influence on the exposure configurations chosen. The location of static objects in the environment, such as traffic lights, signs, roads, and the like, may be identified using a semantic map that has previously identified the location and type of each object based on the vehicle's location without necessarily requiring a camera. Objects in the environment that are dynamic, such as cars, pedestrians, and the like, may be identified in camera images using an object detector (as well as by using other sensor information; for example, the size and shape of the 3D point cloud returned by a LiDAR sensor may indicate a vehicle vs. a person, etc.). The types of the objects, e.g., cars, traffic lights, roads, and so on, may be used to identify a target histogram that corresponds to an exposure configuration for the object type. The histogram may be, for example, a brightness histogram that specifies grey levels of pixels in an image, though other types of histograms may also be used, e.g., color histograms. Using the exposure configurations that are appropriate for that particular types of objects in images improves the quality of the images and consequently the accuracy of object detection. For example, the locations of objects in an image may be identified in the images with greater precision when using the appropriate exposure configuration.

In particular embodiments, the optimal target histogram may have previously been generated for the object type using an offline optimization process, which may search a parameter space for optimized camera setting values that produce images for which an object detector performs well when recognizing particular object types. Target histograms that correspond to the optimized camera setting values may be stored for subsequent use with other images that contain objects of those particular types. There may be different target histograms for different environmental conditions, such as particular times of day, weather, and so on. In particular embodiments, the location of the sun and any lens flares may be predicted based on the vehicle's location, heading, and time of day. The sun's location can be used to adjust the exposure of nearby objects accordingly, or the sun can be removed from consideration when determining exposure and a warning sent to the vehicle system that nearby object(s) may be unresolvable.

FIG. 1A illustrates an example vehicle environment 100. The vehicle environment 100 may be in range of one or more sensors of a vehicle. A vehicle system may determine a location, orientation, and/or heading of the vehicle using sensors such as LiDAR, an inertial measurement unit (IMU), cameras, and so on. The vehicle system may use a localization technique to determine the vehicle's location, orientation, and/or heading based on data from the sensors and/or map data retrieved from geographic maps and/or semantic maps. Objects in the vehicle environment 100 include the sun 102, a traffic light 104, cars 106, 108, pedestrians 110, 112, and a road 114. The traffic light 104 and road 114 are examples of static objects, since their locations do not ordinarily change. The cars 106, 108 and pedestrians 110, 112 are examples of dynamic objects, since their locations may change over time. The location of the sun 102 changes over time according to a defined trajectory, so the location of the sun in the vehicle environment 100 (e.g., the coordinates of the sun in an image of the vehicle environment 100) may be determined based on the current time, geographical location, and information about the direction in which the camera is pointing. The amount of sunlight and/or the brightness level of the sun may also be determined from known weather and/or observed sun patterns for different conditions.

Figure 1B:
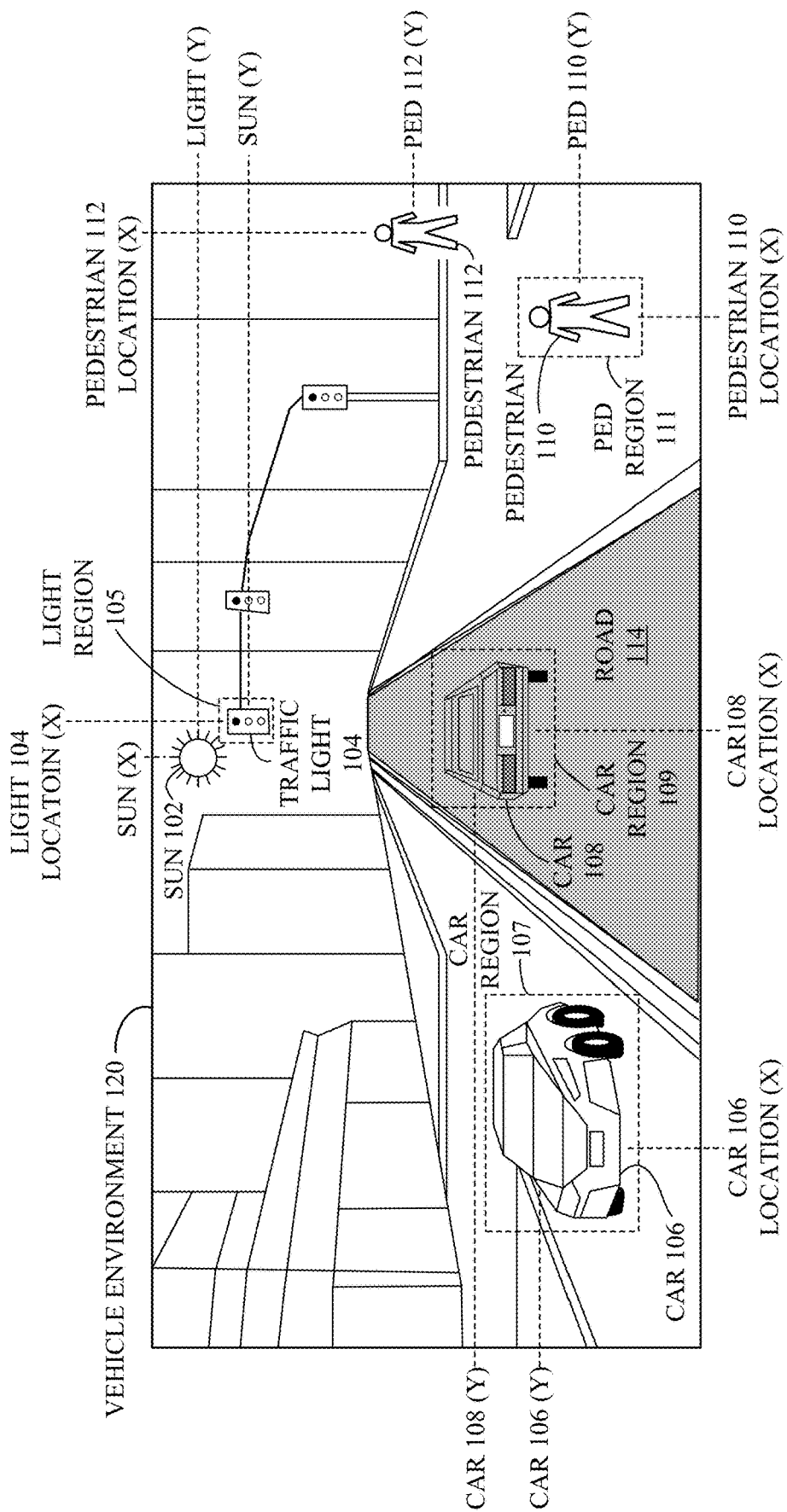
FIG. 1B illustrates example locations of objects in an example vehicle environment.

FIG. 1B illustrates example locations of objects in an example vehicle environment 120. The vehicle environment 120 may be captured by vehicle sensors, and the vehicle system may determine the locations of the objects in the environment based on data from the sensors. The term "location" as used herein in relation to objects in vehicle environments may refer to x, y coordinates of the objects in a two-dimensional representation of an environment, such as an image of the vehicle environment 120 captured by a camera of the vehicle. The vehicle system may perform suitable transformations to map three-dimensional locations of objects to and from two-dimensional locations in representations of the environment such as camera images.

The vehicle environment 120 includes the objects shown in FIG. 1A, and also includes additional information related to the objects, such as a location of each object. Each location is shown as an X coordinate and a Y coordinate in the vehicle environment. The coordinates may be relative to an origin such as the bottom left corner of an image of the vehicle environment 120. The location of the sun 102 is identified by (X, Y) coordinates labeled sun (X) and SUN (Y), respectively. The traffic light 104 is enclosed in a region 105, and the location of the traffic light is identified by (X, Y) coordinates labeled light 104 location (X) and light 104 (Y), respectively. The car 106 is enclosed in a region 107, which may be, e.g., a bounding box or the like. The car 106 is also associated with location coordinates labeled car 106 location (X) and car 106 (Y). The coordinates may identify the location of, for example, the center of the car 106 as shown in the vehicle environment 120, or other suitable point associated with the car 106. The car 108 is enclosed in a region 109 and has coordinates labeled car 108 location (X) and car 10 (Y). The car 108 is located on a road 114. The road may have a location and region (not shown). The pedestrian 110 is enclosed in a pedestrian region 111 and associated with coordinates labeled pedestrian 110 location (X) and ped 110 (Y). The pedestrian 112 is associated with coordinates labeled pedestrian 1121 location (X) and ped 112 (Y).

FIG. 2 illustrates an example overexposed image 200. The image 200 may have been overexposed as a result of using an exposure duration and/or a gain setting that is greater than appropriate for the environment, or otherwise setting brightness levels of the image to values that cause the pixels of the image 200 to be too bright. For example, if the exposure duration is too long, an excessive amount of light from the sun 102 may reach the camera sensor. As a result, image quality may be poor, and other objects may not be properly exposed and may be difficult to identify or detect in the image 200 using computer-vision techniques. The traffic light 104 is shown using dashed lines to indicate that it is poorly-defined in the image 200. FIG. 3 illustrates an example appropriately-exposed image 300. The image 300 may have been captured or generated using an appropriate exposure duration. Thus, the amount of light to which the camera sensor is exposed produces an image in which the traffic light 104 is readily identifiable or detectable using computer-vision techniques.

Figure 4:
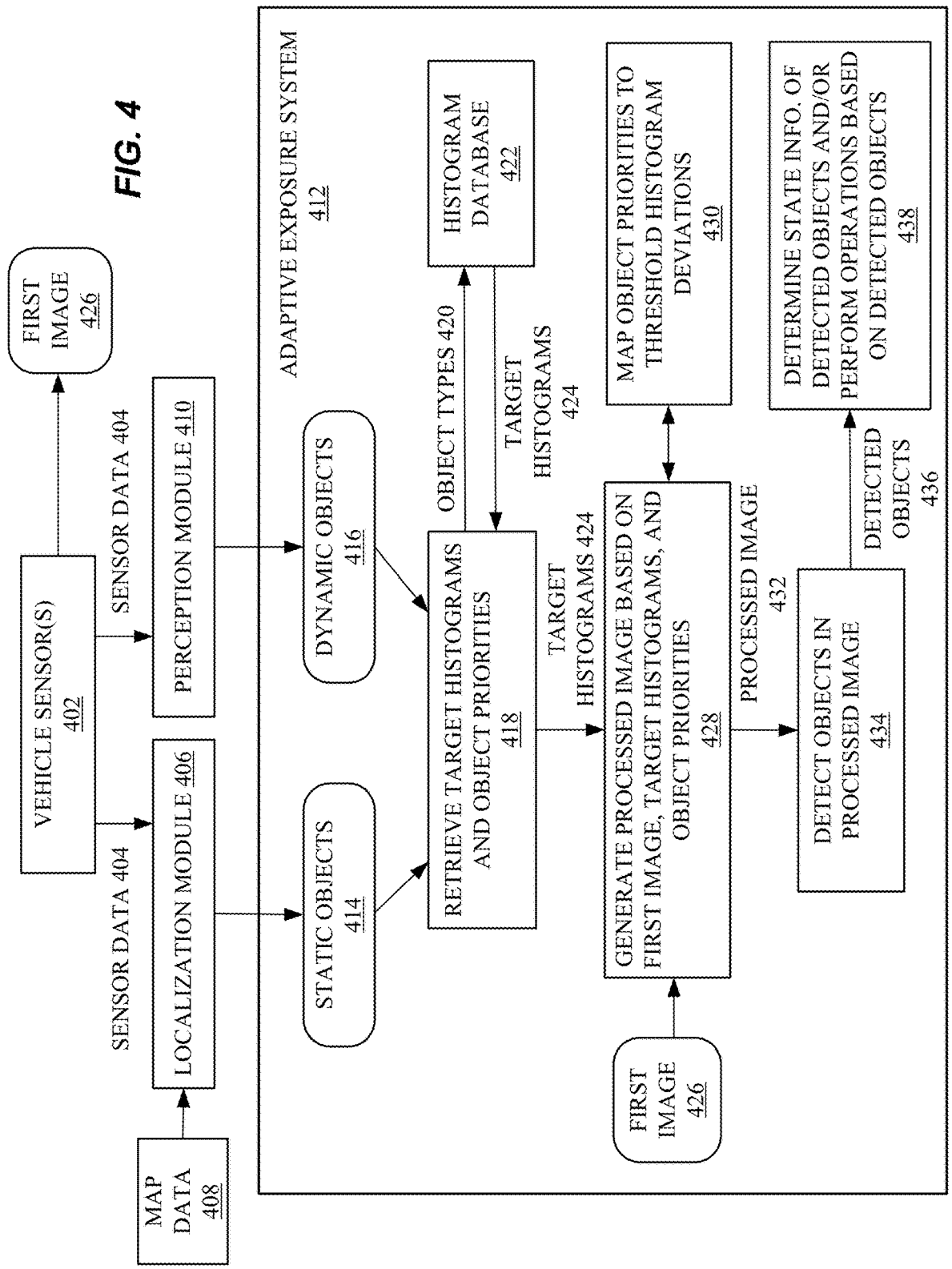
FIG. 4 illustrates an example adaptive exposure system.

FIG. 4 illustrates an example of an adaptive exposure system 412. Sensor data 404 may be provided by vehicle sensors 402 to a localization module 406, which may identify location information such as a current geographical location, orientation, and/or heading of the vehicle based on the sensor data 404 and map data 408. The map data 408 may be from geographical maps and/or semantic maps (not shown). The localization module 406 may use the location information and map data 408 to identify one or more static objects 414 as well as object types 420 and locations of the static objects 414 in the vehicle environment. Alternatively or additionally, a perception module 410 may identify one or more dynamic objects 416 in camera images received in sensor data 404 from a camera. The perception module 410 may also identify object types 420 and locations of the dynamic objects 416 in the vehicle environment.

In particular embodiments, as shown at block 418, the adaptive exposure system 412 may retrieve target histograms 424 that correspond to object types 420 from a histogram database 422. For example, the block 418 may query the histogram database 422 for histograms that are associated with the object types 420 of the static objects 414 and/or the dynamic objects 416. Block 418 may also retrieve priorities for the objects or histograms. The priorities may be used to indicate the priority of each histogram when there are multiple objects (and multiple corresponding histograms) in an image. As shown at block 428, the adaptive exposure system 412 may receive a first image 426, e.g., from a camera, and generate a processed image 432 based on the first image 426, the target histogram(s) 424, and the object priorities (if the priorities are present). The processed image 432 may be generated by using a histogram matching algorithm to modify the histogram of the first image 426 to match the target histogram 424. That is, the processed image 432 may be generated by processing the first image 426 using a histogram matching algorithm to generate the histogram of the processed image based on the one or more target histograms. The processed image may include pixels having values based on values of the pixels in the first image, and a distribution of tonal values of the pixels of the processed image may match a distribution of tonal values determined from (e.g., retrieved from) the target histogram(s).

In particular embodiments, block 428 may generate the processed image 432 by sending a request to a camera system of the first vehicle to capture the first image 426 and generate the processed image based on the target histograms and on the first image 426. That is, the camera system may capture the first image 426 and generate the processed image 432. Block 428 may receive the processed image 432 from the camera subsystem. The camera subsystem may generate the processed image 432 such that the histogram of the processed image 432 received from the camera system matches the target histograms. Alternatively or additionally, values of camera setting parameters, such as exposure duration and/or gain, may be determined based on the target histogram(s) 424 and sent to the camera system, which may apply the parameter values to the camera and capture the images.

In particular embodiments, when the first image 426 contains multiple objects of different types, the processed image 432 may be generated based on multiple target histograms 424, each of which may contribute equally to a single combined histogram. The combined histogram may be used to generate the processed image 432. To generate the combined histogram, block 428 may use an optimization algorithm to identify a histogram for which a combined distance measure is minimized. In particular embodiments, the combined distance measure may be determined based on a sum of distance measures computed between the combined histogram and from each of the target histograms 424. A threshold tolerance, e.g., 1%, 2%, or the like, may be used in the optimization algorithm, e.g., so each distance in the sum may be increased or decreased by up to the threshold tolerance when determining the combined distance.

In particular embodiments, each target histogram 424 may be associated with a weight, e.g., the object priorities, and the distance measure for each of the target histograms may be multiplied by a value based on the corresponding priority (e.g., 1.0−priority/10). Distances for individual target histograms 424 may have greater tolerances to permit reductions in performance of the object detection model for the object types associated with those individual target histograms. The tolerances may be determined based on the corresponding priority (e.g., priority/100). Alternatively, the contributions of the target histograms to the combined histogram may be based on the priorities using other techniques, such as a mapping between an object detector's precision-recall curve and the target histograms 424, as described below.

In particular embodiments, when the first image 426 contains multiple objects of different types, the processed image 432 may be generated based on multiple target histograms 424, each of which may be associated with an object priority. For example, pedestrians may be associated with priority 1 (high priority), cars with priority 2 (medium-high priority), traffic lights with priority 3 (medium-low priority) and roads with priority 4 (low priority). In particular embodiments, a predicted path for an object may also be used to determine the object priority. For example, an object moving away from the vehicle (or the vehicle's planned path) may have a lower priority than an object moving toward the vehicle (or the vehicle's planned path). Further, an object having a spatial association with the vehicle may have higher priority than objects not spatially associated with the vehicle. As an example, a traffic light not connected to the lane in which the vehicle is located may have a lower priority than a traffic light that controls the lane the vehicle is in. Motion planning relevance may be used to determine object priority or relevance. Objects that are moving away from the vehicle or have low likelihood of entering the drivable region of the vehicle in the near future are less relevant and may be associated with lower priorities than objects having a high likelihood of entering the drivable region in front of the vehicle.

In particular embodiments, block 430 may use an optimization algorithm to identify a combined histogram for which a combined distance measure is minimized, and distances for individual target histograms 424 may have greater tolerances to permit reductions in performance of the object detection model as described above. Further, the tolerances for the individual target histograms 424 may be determined based on the object priorities and a mapping between an object detector's precision-recall curve and the target histograms 424 that permits greater tolerances, with the tolerances being determined based on the mapping.

Block 430 may determine a threshold minimum recall rate for each object type. (Alternatively, block 430 may determine an amount by which the object detector model's prediction recall may deviate from 1.0 (e.g., from 100% recall). A threshold true-positive rate may be determined for each of the object types 420 (for which there is a target histogram 424) based on the corresponding priorities of the object types 420 (which may correspond to static objects 414 and/or dynamic objects 416). For example, priority 1 (pedestrians) may correspond to a threshold true-positive rate of 99%, priority 2 (cars) may correspond to a threshold true-positive rate of 95%, priority 3 (traffic lights) may correspond to a threshold true-positive rate of 93%, and priority 4 (roads) may correspond to a threshold true-positive rate of 90%. Although particular types of objects are described in this example, any suitable types of objects may be identified and associated with histograms.

In particular embodiments, block 430 may determine a threshold histogram-deviation rate for each of the object types based on a mapping from the threshold true-positive rates to the corresponding threshold histogram-deviation rates. This mapping may be determined based on the object detector model, and may be, for example, a function that performs the mapping, or a list of threshold true-positive values (e.g., inputs) and corresponding threshold histogram-deviation rates (e.g., outputs). For example, the mapping may map the true-positive rates of 99%, 95%, 93%, and 90% to histogram-deviation rates of 5%, 10%, 12%, and 16%, respectively. The histogram-deviation rates may be used for the tolerances described above to permit reductions in performance of the object detection model for the object types associated with the target histograms that correspond to the histogram-deviation rates. Thus, for example, when generating a combined histogram using an optimization algorithm, in the distance calculations, the distance from the combined histogram to the histogram for pedestrians may be permitted to deviate by a tolerance of up to 5%. Further, the histograms for cars, traffic lights, and roads may be permitted to deviate by up to 10%, 12%, and 16%, respectively. That is, for each of the object types, the combined histogram differs from the corresponding target histogram by less than the threshold histogram-deviation rate that corresponds to the target histogram. Although particular threshold numbers are used in this example, any suitable numbers may be used. For example, the particular numeric values may be determined based on configuration information specified by an administrator, based on heuristic or probabilistic models, or in any other suitable way.

In particular embodiments, block 428 may identify a location of the sun and exclude the sun and/or sun-related effects, such as lens flare, from the processing that is performed to generate the processed image 432. Thus, the processed image 432 may be generated based on the first image 426 without the sun. Subsequent processing of the processed image 432, e.g., by the object detector at block 434, may produce better results without the sun in the processed image 432. For example, the sun's brightness may skew the brightness histogram of the processed image 432 to greater levels, which may reduce the image quality in regions that contain objects to be recognized, such as traffic lights. Accordingly, step 428 may determine a location of the sun or one or more sun-related effects (e.g., lens flare from the sun) in the first image 426, and exclude one or more regions of the first image comprising the sun and/or the sun-related effects from the processing performed to generate the process image 432. For example, a histogram of the first image 426 may be computed based on the first image while excluding the region(s) comprising the sun and/or sun-related effects. The region(s) may be excluded by, for example, not using those regions of the first image in the computation of the histogram. Excluding the region(s) does not necessarily remove the region(s) from the new image (e.g., a new image without the excluded region(s) is not necessarily created). The histogram of the first image may then be used when generating the processed image, e.g., using a histogram matching algorithm to transform the first image 426 to the processed image 432 based on the target histogram(s) 424. In particular embodiments, the location of the sun in the first image may be determined based on a time of day, a geographic location of the vehicle, and/or an orientation of the camera that captured the first image.

At block 434, the adaptive exposure system 412 may detect one or more objects 436 in the processed image 432 using, for example, a machine-learning model (e.g., a perception model) that performs object detection. Block 438 may determine state information associated with the detected objects 436 and/or perform one or more vehicle-related operations based on the detected objects 436. As an example, the determined state information may be a location, such as (x, y) coordinates, of each of the detected objects 436. Using the adaptive exposure system 412 may improve the quality (e.g., focus or sharpness) of the processed image 432 so that the detected objects are depicted with greater accuracy. Thus, state information associated with the detected objects, such as the location, orientation, size, speed, heading, and/or type of each detected object 436 can be determined with greater accuracy than would be provided by existing techniques for determining exposure parameters. The state information may be used by components of an algorithmic navigation pipeline such as that shown in FIG. 13. For example, the adaptive exposure system 412 may be used to improve the quality of images captured by optical cameras associated with a sensor data module 1305. The improved image quality can improve the results produced by a perception module 1310, such as state information associated with objects (e.g., agents) in the environment of the vehicle. The state information may include characteristics of the objects, such as velocities, moving directions, accelerations, trajectories, relative distances, or relative positions of these agents. The adaptive exposure system 412 may improve the accuracy of one or more of these characteristics. In particular embodiments, the perception module 1310 may also leverage information from a high-definition map. The high-definition map may include a precise three-dimensional model of the environment, including buildings, curbs, street signs, traffic lights, and any stationary fixtures in the environment. Using image-based localization techniques based on the images enhanced by the adaptive exposure system 412, e.g., simultaneous localization and mapping (SLAM), the perception module 1310 may more accurately determine the pose (e.g., position and orientation) of the vehicle or the poses of the vehicle's sensors within the high-definition map.

As another example, if a detected object 436 is a traffic light, block 438 may determine the state of the traffic light and cause one or more additional vehicle operations, e.g., braking, to be performed based on the state of the traffic light. Any other suitable vehicle operations may be performed, e.g., presenting information, such as warnings, to a driver or passenger of the vehicle.

Figure 5:
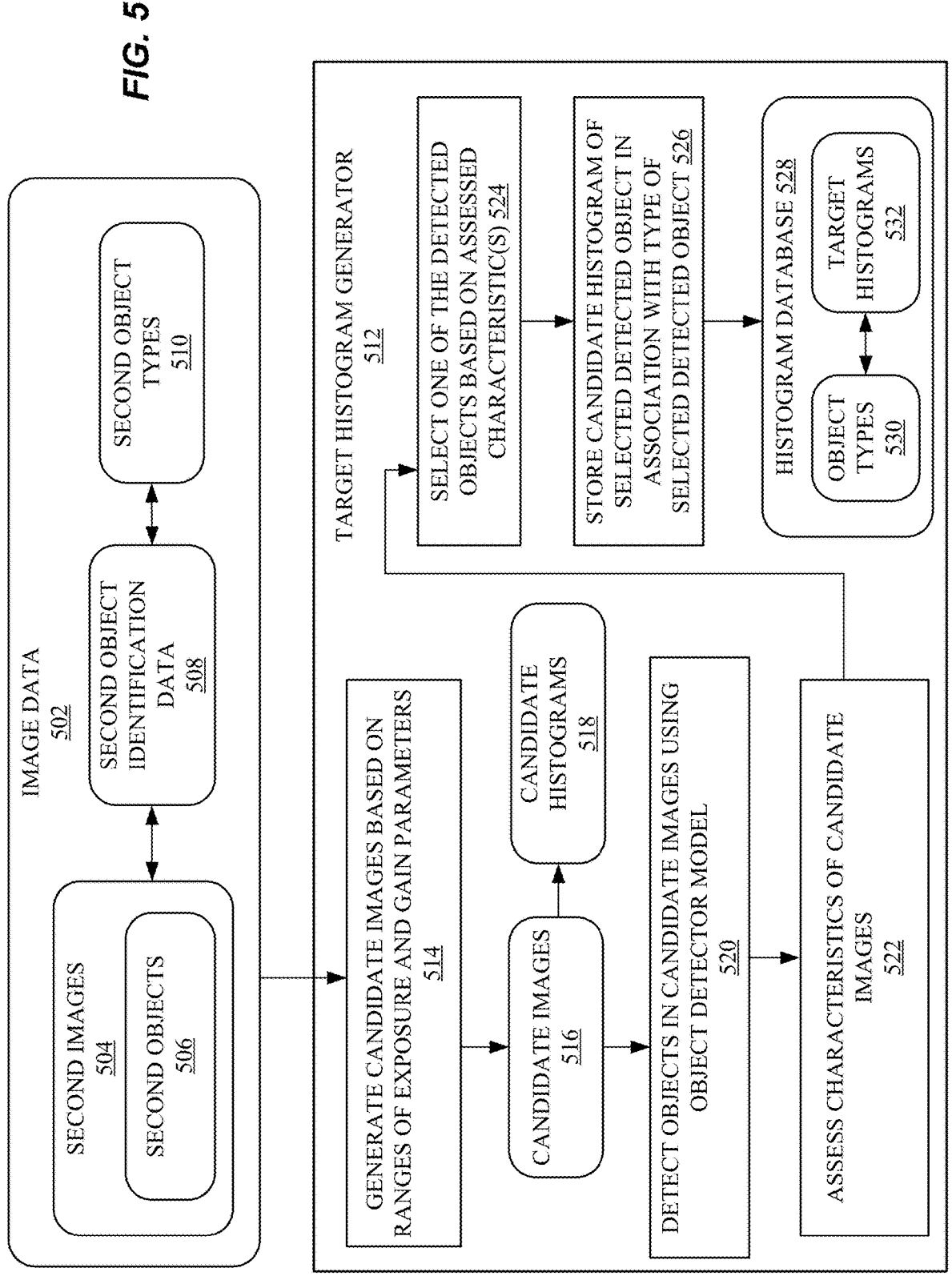
FIG. 5 illustrates an example target histogram generator.

FIG. 5 illustrates an example target histogram generator 512. The target histogram generator 512 may generate one or more target histograms 532 for second objects 506 in image data 502, and store the target histograms 532 in a histogram database 528 for subsequent retrieval. The image data may include one or more second images 504, each of which may depict one or more second objects 506. To generate the target histograms 532, the target histogram generator 512 may generate candidate exposure and/or gain parameter values, generate candidate images 516 based on the exposure and/or gain parameter values, and evaluate the candidate images to determine which candidate images 516 have desirable characteristics (e.g., produce good performance in an object detector model, have high contrast, or have other desirable characteristics). The candidate images 516 having desirable characteristics may be used to generate the target histograms 532 for the second objects 506 depicted in the candidate images 516. Each candidate image 516 may depict a subset of the second objects depicted in all the second images 504. Each of the second images 504 may be associated with corresponding second object identification data 508, e.g., the locations, time of day at which the second image was captured, and/or other information associated with the second objects 506 in the second image 504, and further associated with second object types 510 that identify the types of the second objects 506 in the second image 504.

For example, each second image 504 may be associated in the histogram database 528 with a time of day at which the second image 504 was captured, and the target histogram 532 may be stored in association with the second object type (stored as an object type 530) and the time of day. The stored object type 530 and associated target histogram 532 associated with the time of day may subsequently be retrieved from the histogram database using a query that specifies a time of day or a range of times of day. Other time or date quantities, such as morning, afternoon, evening, night, day of week, weekday, weekend day, month, or the like, may be used in addition to or instead of the time of day. The histogram database 528 may be, for example, a database located on a storage device on the vehicle, in a cloud, or a combination thereof.

In particular embodiments, if the image data 502 is not available, it may be determined using an object detection model on second images 504 images that are known to be of good quality. The terms "first" and "second" are used herein for explanatory purposes to distinguish different objects in this description, and are not meant to imply any precedence or ranking of the objects.

In particular embodiments, at block 514, the target histogram generator 512 may generate one or more candidate images 516 based on one or more ranges of camera setting parameter values, such as exposure duration, gain (also referred to as ISO), or the like. A different candidate image 516 may be generated for each different combination of parameters. These ranges may be used to perform a "sweep" through values in a parameter space, and may range from minimum to maximum values of the corresponding parameters. The "sweep" may be used to identify values of the parameter that result in sufficient or optimal performance of an object detector model on the candidate images (at least for the parameter values in the ranges used). The minimum and maximum values may be any specified values for use in identifying suitable parameter values between the minimum and maximum. For example, the range of parameter values for the exposure duration parameter may be from 1 second down to $1/800$ (one eight-hundredth) seconds, in intervals of $1/10$, $1/50$, or other suitable interval. In this example, the minimum value is $1/1800$ and the maximum value is 1, though other values may be used in other examples, e.g., 3 seconds to $1/2000$ second in intervals of $1/1000$ second. As another example, the values for the gain parameter may range from 32 to 1800 in increments of 16, or, in still another example, from 50 to 400 in increments of 50. In particular embodiments, a first one of the parameters (e.g., exposure duration) may be varied while a second one (e.g., gain) is held constant at an initial value. If a suitable value of the first parameter is found (e.g., having sufficient or optimal assessed performance), then the value of the second parameter value may be used with the suitable value of the first parameter. Otherwise, if a suitable value of the first parameter is not, found, then the second parameter may be changed by its increment value, and the resulting value of the second parameter may be used with each value of the first parameter, and so on.

In particular embodiments, the target histogram generator 512 may evaluate the candidate images 516 to identify a suitable one of the candidate images 516. The candidate histogram 518 associated with the suitable one of the candidate images 516 may then be stored in the histogram database 528. The suitable one of the candidate images 516 may be identified based on criteria such as contrast characteristics of the candidate images 516, the performance of an object detector model in detecting the second objects 506 in the candidate images 516, or other suitable criteria.

In particular embodiments, the candidate images 516 may be evaluated to identify the target histograms 532 based on contrast characteristics of the candidate images 516. Higher contrast typically results in better object detection than lower contrast. For example, an object detection model such as a neural network may identify objects more accurately when contrast is higher because high contrast corresponds to stronger transitions between color channels at the edges of objects. Thus, at least one of the candidate images having the highest contrast may be selected, and the candidate histogram 518 associated with the selected one of the candidate images 516 may be stored in the histogram database as a target histogram 532 in association with one or more object types 530 of the second objects 506 in the candidate image 516. For each of the candidate images 516, one or more of the second objects 506 may be detected in the candidate image, and the contrast characteristics of the candidate image may be determined, e.g., based on a histogram of the candidate image. The contrast characteristics may be determined for the candidate image as a whole, or separately for each second object 506 detected in each candidate image by an object detector model (or other suitable object identification technique). One of the candidate images may be selected based on the contrast characteristics, such as the candidate image having the widest histogram (the widest histogram may be, e.g., the histogram having the greatest difference between the brightness of the darkest pixel and the brightness of the brightest pixel). Since contrast measures the difference in brightness between light and dark areas of an image, wider histograms may indicate that an image has higher contrast, while narrower histograms nay indicate that an image has lower contrast. The type of each object identified in the selected candidate image (as determined by the object detector, for example) may be stored in the histogram database 528 as an object type 530 in association with a histogram of the selected candidate image (e.g., the associated candidate histogram 518 may be stored as the target histogram 532), as described below.

In particular embodiments, the candidate images 516 may be evaluated to identify the target histograms 532 based on the performance of an object detector model. At block 520, the target histogram generator 512 may attempt to detect one or more objects in each of the candidate images 516 using an object detector model. As an alternative to using an object detector model, block 520 may receive previously-determined information about the types (and, optionally, positions of) the second objects 506 in each of the candidate images 516. This information may be received as part of training data, for example. Block 522 may assess one or more characteristics of the candidate images 516. For example, block 522 may determine contrast characteristics of the candidate images 516, such as the width of the histogram of each candidate image 516, as described above. The contrast characteristics may be assessed based on the entire candidate image 516 or on portions of the candidate image 516, such as the portions of the candidate image 516 that depict the detected objects from block 520. For each candidate image 516, the portion of the image may be a bounded region that includes the detected object and an area of the candidate image 516 surrounding the detected object (e.g., up to a predetermined threshold distance from the detected object, a bounding box, or other image region) so that contrast between the detected object and its surrounding area may be determined. The contrast determined in this way for each detected object may be used in block 524 to select one of the second objects as described below.

As another example, block 522 may assess characteristics of the candidate images 516 by determining a performance assessment of the object detector model in detecting the second images in the candidate images. The performance assessment may be determined by, for example, counting the number of true-positives (e.g., object known to be present in a candidate image 516 according to the second object identification data 508 identified by the detection model), false-positives (e.g., object known to not be present according to the data 508 is identified), false-negatives (e.g., object known to be present according to the data 508 is not identified), and/or true-negatives (e.g., object known to not be present according to the data 508 is not identified). For example, the performance assessment of the object detection machine-learning model for the second object type may be based on performance of the model in detecting one or more of the second objects 506 in a test region (e.g., a rectangular area of the candidate image 516) that does not contain any of the second objects 506, wherein the performance assessment comprises a true-negative rate, a false-negative rate, or a combination thereof. Precision, recall, or other suitable performance metrics of the detection model's performance for each of the second objects 506 in the candidate image 516 may be calculated based on the counts of true-positives, false-positives, false-negatives, and true-negatives.

At block 524, the target histogram generator 512 may select one of the detected objects (or one of the detected object types) based on the assessed characteristics. For example, if block 522 assesses the contrast (e.g. histogram width) of the candidate images 516, then at block 524 the selected detected object may be one having the widest histogram. As another example, if block 522 assesses the performance of the object detector model, then at block 524 the selected detected object may be one having the greatest value and/or greatest rate of at least one of the performance metrics (e.g., recall, count of true-positives, and so on). Block 526 may store the candidate histogram 518 of the selected detected object in the histogram database 528 in association with the type of the selected detected object. The candidate histogram 518 of the selected detected object may be determined by computing a histogram of the candidate image 516 that contains the selected detected object. The histogram may be computed based on bounded region that contains the selected detected object (in the candidate image 516 that contains the selected detected object). The bounded region may be, for example, enclosed by a bounding box generated based on the selected detected object, or may extend outward from the detected object up to a predetermined distance, as described above. The histogram may be generated based on the region instead of the overall candidate image 516 if, for example, the object detector was provided with the region instead of the overall candidate image 516 as input at block 520 prior to detecting the selected detected object. The type of the selected detected object may be stored in the histogram database 528 as one of the object types 530, the candidate histogram 518 of the selected detected object may be stored as one of the target histograms 532, and an association between the one of the object types 530 and the one of the target histograms may also be stored in the histogram database 528.

Figure 6:
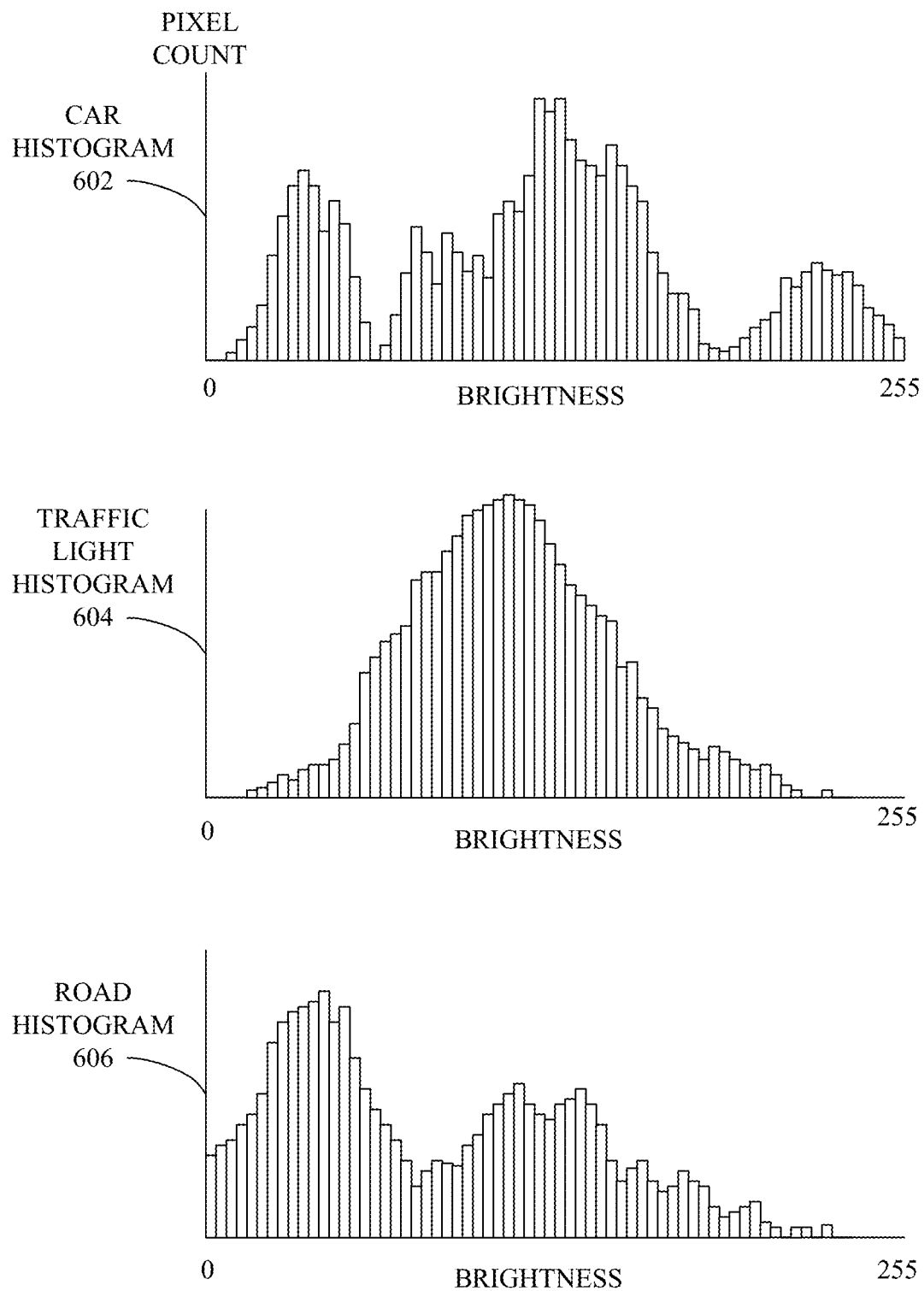
FIG. 6 illustrates example histograms for example image types.

FIG. 6 illustrates example histograms for example image types. A car histogram 602 corresponds to a distribution of pixel values in an image of a car and may have been generated based on an image of a car, e.g., the region 107 of FIG. 1B that contains the car 106, or on an image of another portion of the vehicle environment 120 that depicts the car 106. This car histogram 602 may be generated by counting the number of pixels of having each one of a set of distinct values in the image (e.g., the number of pixels having a brightness of 0 in the region 107 may be represented by the first column of the car histogram 602. If pixels are represented as 8-bit quantities, then each histogram may have 256 columns. The height of each column may represent a number of pixels having or corresponding to a particular value. In particular embodiments, a histogram may include a set of count values, and each count value represents a number of pixels having a particular pixel value. The histograms shown in FIG. 6, such as the car histogram 602, are examples and do not necessarily represent histograms of actual images. Further, although a particular number of columns are shown in each histogram of FIG. 6, the histograms may have any suitable number of columns (e.g., 256 columns corresponding to 256 different pixel brightness, grey, color values, or other suitable pixel value).

In particular embodiments, a traffic light histogram 604 corresponds to a distribution of pixel values in an image of a traffic light and may have been generated based on an image of a traffic light, e.g., the region 105 of FIG. 1B or an image of another portion of the vehicle environment 120 that depicts the car 106. A road histogram 606 corresponds to a distribution of pixel values in an image of a road, such as an image of the vehicle environment 120 that includes the road 114. The road 114 is darker in color overall than the traffic light 104 and the car 106, so the histogram 606 of the road 114 has more pixel values in the region of darker colors on the left side of the histogram 606 than do the histograms 602, 604.

Figure 7:
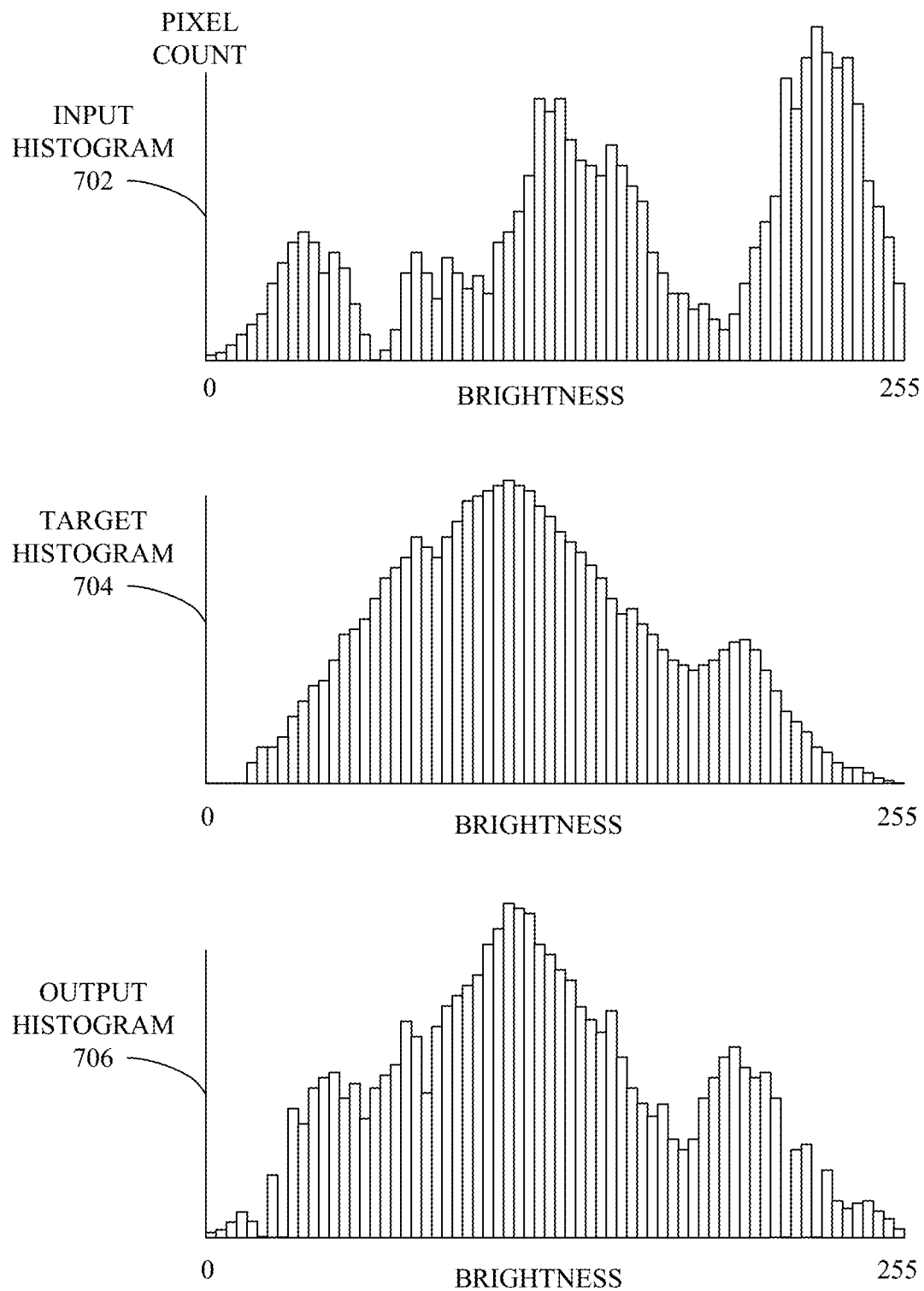
FIG. 7 illustrates an example histogram mapping in which an image is transformed so that its brightness histogram matches a target histogram.

FIG. 7 illustrates an example histogram mapping in which an image is transformed so that its brightness histogram matches a target histogram 704. An image (not shown) having an "input" histogram 702 may be transformed so that its histogram (e.g., its pixel brightness distribution) matches the target histogram 704 using a histogram matching algorithm. The histogram matching algorithm may be unable to transform an image to have a histogram identical to the target histogram 704. The term "matches" as used herein may refer to a match generated by a histogram matching algorithm, and does not necessarily imply an identical match in which all of the count values in two histograms are the same. In the example of FIG. 7, a histogram matching algorithm has transformed an input image that initially has an input histogram 702 to an output image that has an output histogram 706 matching the specified target histogram 704. The output histogram 706 is not identical to the target histogram 704, but is similar and is referred to as a "match" herein because it is generated by a histogram matching algorithm.

Figure 8:
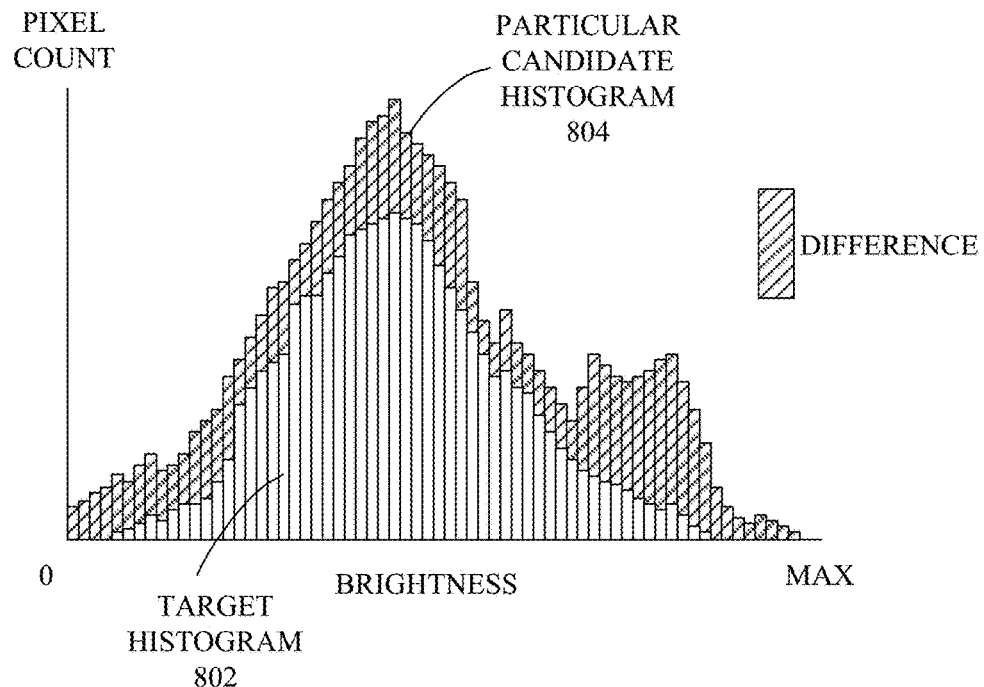
FIG. 8 illustrates an example difference between a target histogram and a particular candidate histogram.

FIG. 8 illustrates an example difference between a target histogram 802 and a particular candidate histogram 804. Differences between histograms may be represented by quantities such as the area of non-overlapping regions of the histograms, "distances" between corresponding columns of the histograms (e.g., the difference between the number of pixels of brightness 8 in the two histograms, e.g., 10 pixels–3 pixels=7 pixels, or a percentage such as 70%). The candidate histogram 804 has more pixels of every brightness level than the target histogram 802, and the difference is shown as a cross-hatched area above the target histogram 802. Minimizing the difference between the histograms 802, 804 would reduce the size of the cross-hatched area (e.g., the non-overlapping area), and the minimal difference may correspond to identical histograms.

Figure 9:
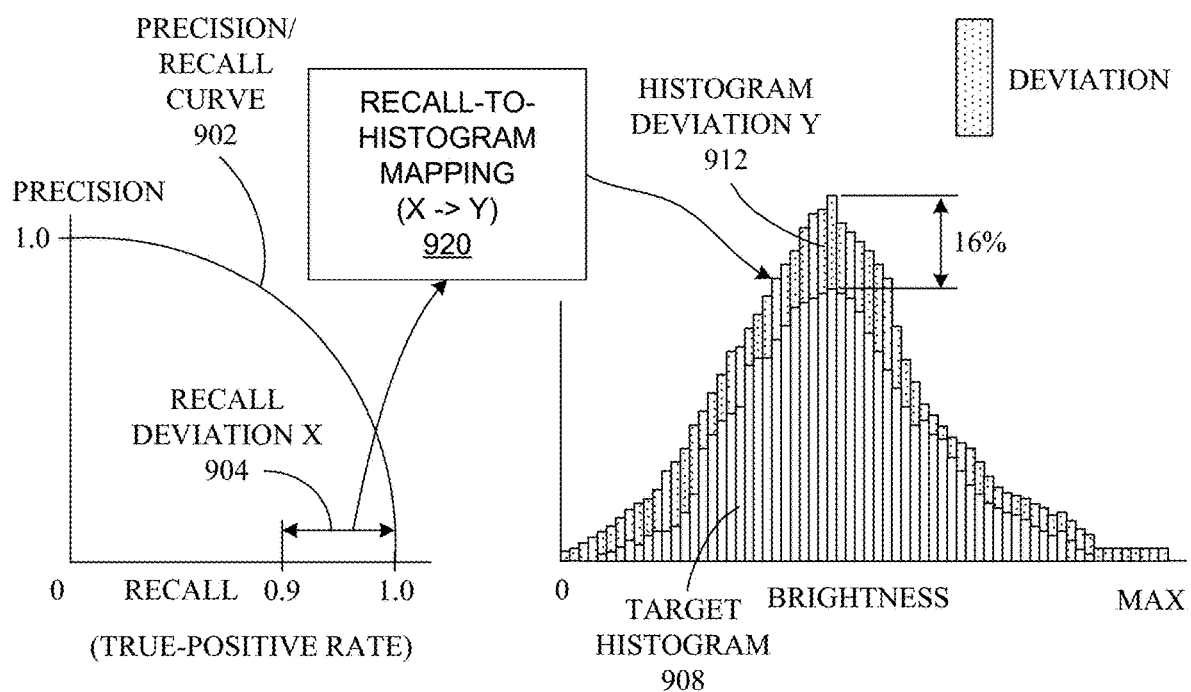
FIG. 9 illustrates an example mapping between deviations from a precision-recall curve of an object detector and corresponding deviations from a histogram.

FIG. 9 illustrates an example mapping between deviations from a precision-recall curve 902 of an object detector and corresponding deviations from a histogram 908. The deviations may be tolerances by which candidate target histograms may deviate from the target histogram 908. The precision-recall curve 902 may be determined based on performance of a model such as an object detector model, e.g., as described with reference to FIG. 5. The precision-recall curve 902 shows the relation between precision (y-axis) and recall (x-axis) for the model. Recall may also be referred to as a true-positive rate. A mapping 920 relates the precision-recall curve 902 to the target histogram 908. More specifically, an amount of deviation from the recall rate of 1.0, which is shown as a distance X 904 on the recall axis, can be mapped to an amount of deviation from the target histogram 908, which is shown by a difference Y 912 in height between a target histogram 908 and a target histogram having a deviation 912. That is, an amount of recall deviation X 904 may be mapped to an amount of histogram deviation Y 912. For example, if the true-positive rate is permitted to deviate from 1.0 by up to 0.1 (e.g., can be 90% or greater), then a candidate histogram may deviate from a target histogram by up to 16%. Other examples of the mapping 920, as described above with reference to FIG. 4, include mappings from true-positive rates of 99%, 95%, and 93% to respective histogram-deviation rates of 5%, 10%, and 12%.

In particular embodiments, the deviations 904, 912 may be threshold quantities, e.g., bounds on the amount of deviation. Thus, the histogram-deviation rate 912 may be the maximum of the deviations from the target histogram 908, e.g., the 16% deviation shown above the top middle of the histogram 912 (which is greater than deviations farther to the left and right in this example). Although the deviations are shown above the target histogram 908, they may represent permissible deviations above or below the target histogram 908 in particular embodiments. The mapping 920 may be determined by, for example, evaluating the performance of the model based on a range of input values. Although particular examples of a recall-to-histogram mapping and particular example deviation quantities are described, any suitable mappings and deviation quantities may be used.

FIG. 10 illustrates an example minimized-distance histogram 1006 for which a distance measure has been minimized across a plurality of histograms 1002, 1004. The minimized-distance histogram 1006 calculated for multiple histograms that correspond to different object types, such as a car histogram 1002 and a traffic light histogram 1004, may be used as a combined histogram for the different object types, as described with reference to FIG. 4. In particular embodiments, the minimized-distance histogram 1006 may be a histogram for which a distance measure (e.g., difference in pixel count) between corresponding columns (e.g., columns for the same brightness value) is minimized across the plurality of histograms 1002, 1004. Thus, for example, the difference in pixel counts for brightness value 5 between the minimized-distance histogram 1006 and the car histogram 1002, e.g., 30 pixels as an example, plus the difference in pixel counts for brightness value 5 between the minimized-distance histogram 1006 and the traffic light histogram 1004, e.g., 40 pixels, which is, e.g., a sum of 70 pixels, is less than or equal to the sum of the corresponding distances form the histograms 1002, 1004 to any histogram other than the minimized-distance histogram 1006. Thus, the minimized-distance histogram 1006 may be generated such that, for each column (e.g., brightness value) of the histogram 1006, the total of the differences between the value of that column in the minimized histogram 1006 and the values of the corresponding columns in the plurality of other histograms (e.g., the histograms 1002, 1004) is minimized.

Although the distance measure is minimized across two histograms 1002, 1004 in this example, the distance measure may be minimized across any number of histograms in other examples. An optimization algorithm or the like may be used to determine the minimized-distance histogram across histograms. The terms "minimum" and "minimized" refer to a lowest value identified according to the techniques described herein, and do not necessarily refer to an absolute minimum such as a lowest possible value or a minimum of all possible values. Further, although particular measures of the minimized-distance histogram are described, other suitable measures may be used.

Figure 11:
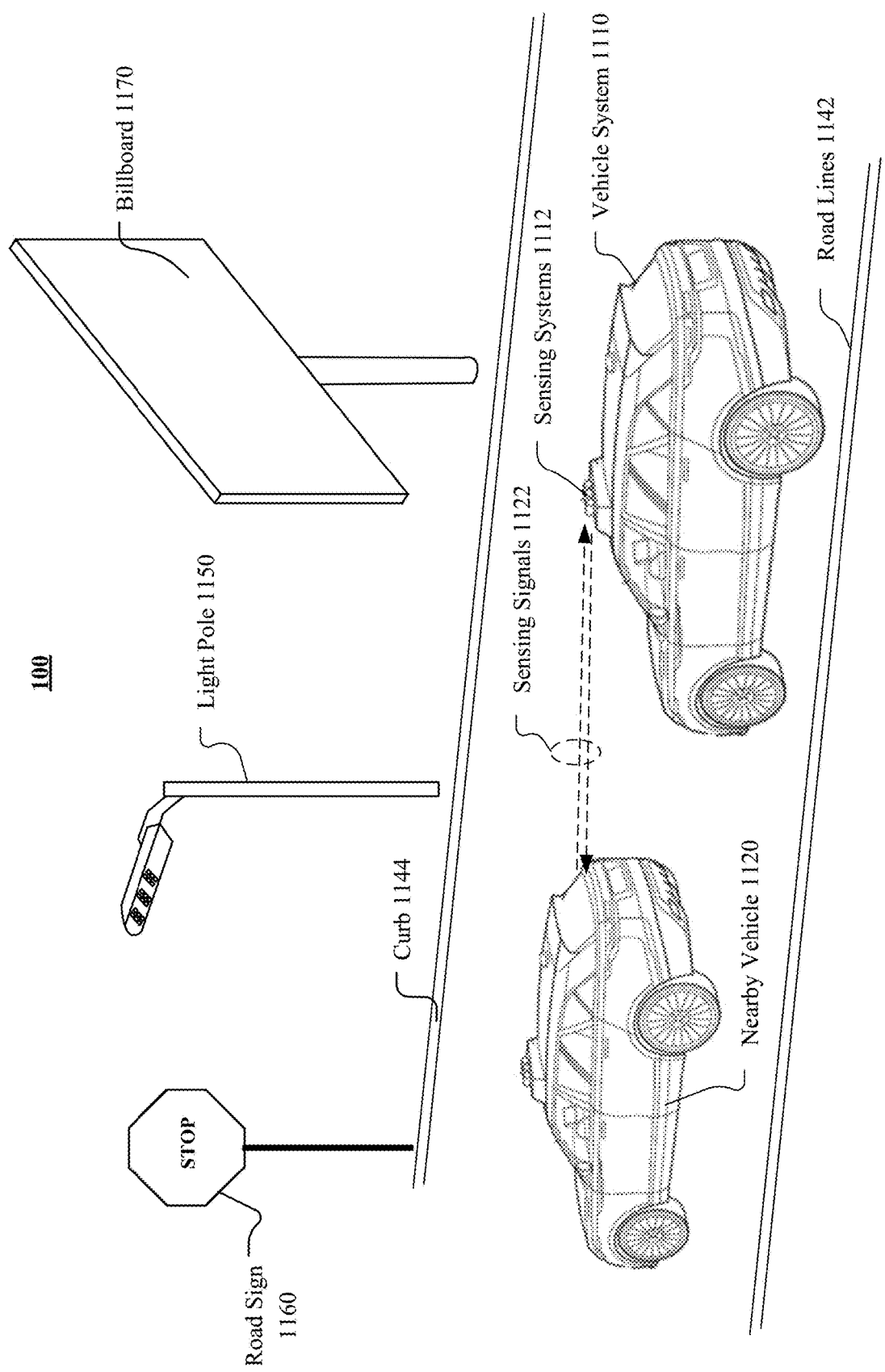
FIG. 11 illustrates an example situation for a data-gathering vehicle system to collect vehicle data of a nearby vehicle and contextual data of the surrounding environment.

FIG. 11 illustrates an example situation for a data-gathering vehicle system 1110 to collect vehicle data of a nearby vehicle 1120 and contextual data of the surrounding environment. In particular embodiments, the vehicle system 1110 (e.g., autonomous vehicles, manually-driven vehicles, computer-assisted-driven vehicles, human-machine hybrid-driven vehicles, etc.) may have a number of sensors or sensing systems 1112 for monitoring the vehicle status, other vehicles and the surrounding environment. The sensors or sensing systems 1112 may include, for example, but are not limited to, cameras (e.g., optical camera, thermal cameras), LiDARs, radars, speed sensors, steering angle sensors, braking pressure sensors, a GPS, inertial measurement units (IMUs), acceleration sensors, etc. The vehicle system 1110 may include one or more computing systems (e.g., a data collection device, a mobile phone, a tablet, a mobile computer, an on-board computer, a high-performance computer) to collect data about the vehicle, the nearby vehicles, the surrounding environment, etc. In particular embodiments, the vehicle system 1110 may collect data of the vehicle itself related to, for example, but not limited to, vehicle speeds, moving directions, wheel directions, steering angles, steering force on the steering wheel, pressure of braking pedal, pressure of acceleration pedal, acceleration (e.g., based on IMU outputs), rotation rates (e.g., based on IMU/gyroscope outputs), vehicle moving paths, vehicle trajectories, locations (e.g., GPS coordination), signal status (e.g., on-off states of turning signals, braking signals, emergence signals), human driver eye movement, head movement, etc.

In particular embodiments, the vehicle system 1110 may use one or more sensing signals 1122 of the sensing system 1112 to collect data of the nearby vehicle 1120. For example, the vehicle system 1110 may collect the vehicle data and driving behavior data related to, for example, but not limited to, vehicle images, vehicle speeds, acceleration, vehicle moving paths, vehicle driving trajectories, locations, turning signal status (e.g., on-off state of turning signals), braking signal status, a distance to another vehicle, a relative speed to another vehicle, a distance to a pedestrian, a relative speed to a pedestrian, a distance to a traffic signal, a distance to an intersection, a distance to a road sign, a distance to curb, a relative position to a road line, an object in a field of view of the vehicle, positions of other traffic agents, aggressiveness metrics of other vehicles, etc. In addition, the sensing system 1112 may be used to identify the nearby vehicle 1120, which could be based on an anonymous vehicle identifier based on the license plate number, a QR code, or any other suitable identifier that uniquely identifies the nearby vehicle.

In particular embodiments, the vehicle system 1110 may collect contextual data of the surrounding environment based on one or more sensors associated with the vehicle system 1110. In particular embodiments, the vehicle system 1110 may collect data related to road conditions or one or more objects of the surrounding environment, for example, but not limited to, road layout, pedestrians, other vehicles (e.g., 1120), traffic status (e.g., number of nearby vehicles, number of pedestrians, traffic signals), time of day (e.g., morning rush hours, evening rush hours, non-busy hours), type of traffic (e.g., high speed moving traffic, accident events, slow moving traffic), locations (e.g., GPS coordination), road conditions (e.g., constructing zones, school zones, wet surfaces, ice surfaces), intersections, road signs (e.g., stop sign 1160, road lines 1142, cross walk), nearby objects (e.g., curb 1144, light poles 1150, billboard 1170), buildings, weather conditions (e.g., raining, fog, sunny, hot weather, cold weather), or any objects or agents in the surrounding environment. In particular embodiments, the contextual data of the vehicle may include navigation data of the vehicle, for example, a navigation map, a navigating target place, a route, an estimated time of arriving, a detour, etc. In particular embodiments, the contextual data of the vehicle may include camera-based localization data including, for example, but not limited to, a point cloud, a depth of view, a two-dimensional profile of environment, a three-dimensional profile of environment, stereo images of a scene, a relative position (e.g., a distance, an angle) to an environmental object, a relative position (e.g., a distance, an angle) to road lines, a relative position in the current environment, a traffic status (e.g., high traffic, low traffic), driving trajectories of other vehicles, motions of other traffic agents, speeds of other traffic agents, moving directions of other traffic agents, signal statuses of other vehicles, etc. In particular embodiments, the vehicle system 1110 may have a perception of the surrounding environment based on the contextual data collected through one or more sensors in real-time and/or based on historical contextual data stored in a vehicle model database.

Figure 12:
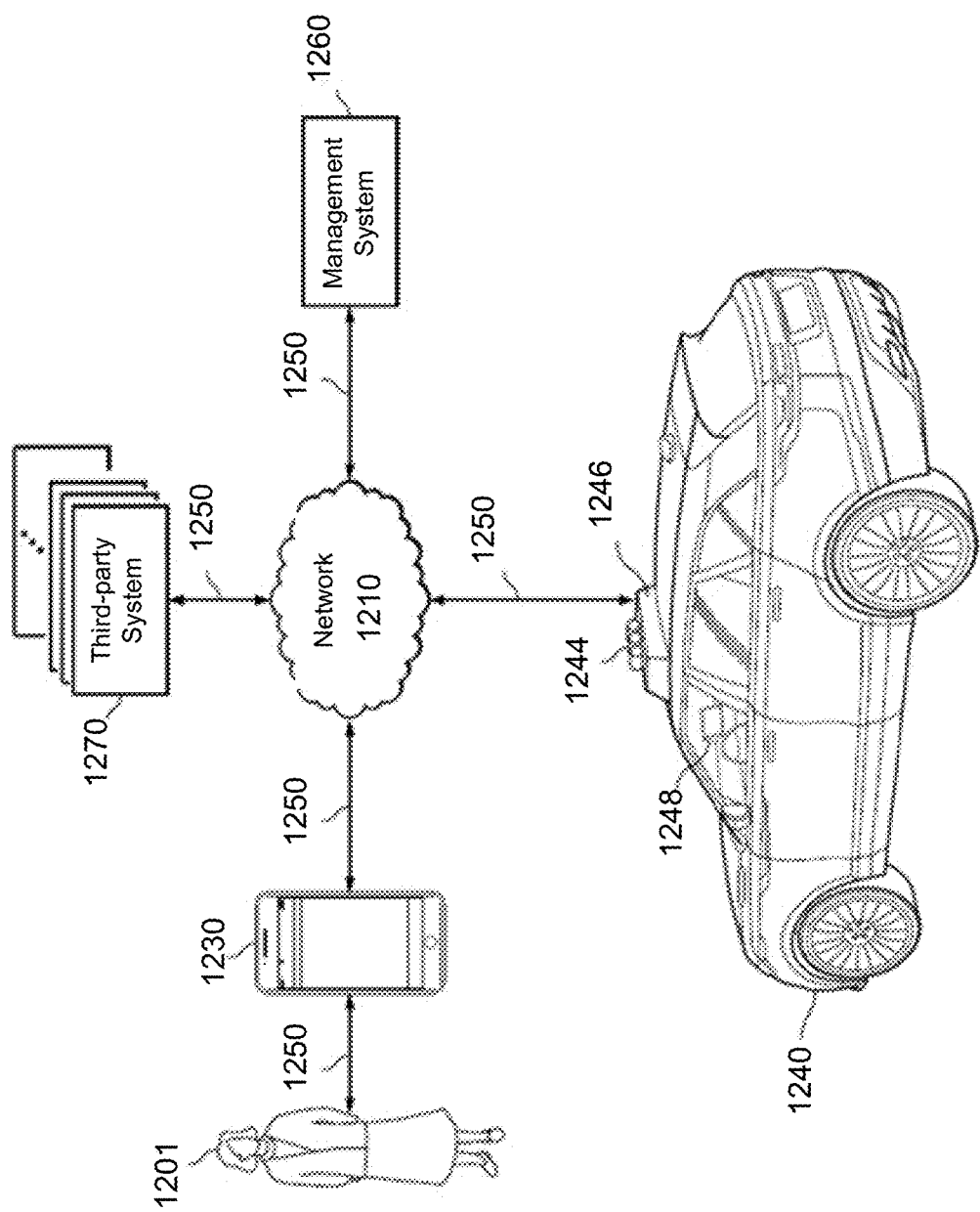
FIG. 12 illustrates an example block diagram of a transportation management environment for matching ride requestors with autonomous vehicles.

FIG. 12 illustrates an example block diagram of a transportation management environment for matching ride requestors with autonomous vehicles. In particular embodiments, the environment may include various computing entities, such as a user computing device 1230 of a user 1201 (e.g., a ride provider or requestor), a transportation management system 1260, an autonomous vehicle 1240, and one or more third-party system 1270. The computing entities may be communicatively connected over any suitable network 1210. As an example and not by way of limitation, one or more portions of network 1210 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 12 illustrates a single user device 1230, a single transportation management system 1260, a single vehicle 1240, a plurality of third-party systems 1270, and a single network 1210, this disclosure contemplates any suitable number of each of these entities. As an example and not by way of limitation, the network environment may include multiple users 1201, user devices 1230, transportation management systems 1260, autonomous-vehicles 1240, third-party systems 1270, and networks 1210.

The user device 1230, transportation management system 1260, autonomous vehicle 1240, and third-party system 1270 may be communicatively connected or co-located with each other in whole or in part. These computing entities may communicate via different transmission technologies and network types. For example, the user device 1230 and the vehicle 1240 may communicate with each other via a cable or short-range wireless communication (e.g., Bluetooth, NFC, WI-FI, etc.), and together they may be connected to the Internet via a cellular network that is accessible to either one of the devices (e.g., the user device 1230 may be a smartphone with LTE connection). The transportation management system 1260 and third-party system 1270, on the other hand, may be connected to the Internet via their respective LAN/WLAN networks and Internet Service Providers (ISP). FIG. 12 illustrates transmission links 1250 that connect user device 1230, autonomous vehicle 1240, transportation management system 1260, and third-party system 1270 to communication network 1210. This disclosure contemplates any suitable transmission links 1250, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more transmission links 1250 may connect to one or more networks 1210, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 1250. For example, the user device 1230 may communicate with the transportation management system via a cellular network and the Internet, but communicate with the autonomous vehicle 1240 via Bluetooth or a physical wire connection.

In particular embodiments, the transportation management system 1260 may fulfill ride requests for one or more users 1201 by dispatching suitable vehicles. The transportation management system 1260 may receive any number of ride requests from any number of ride requestors 1201. In particular embodiments, a ride request from a ride requestor 1201 may include an identifier that identifies the ride requestor in the system 1260. The transportation management system 1260 may use the identifier to access and store the ride requestor's 1201 information, in accordance with the requestor's 1201 privacy settings. The ride requestor's 1201 information may be stored in one or more data stores (e.g., a relational database system) associated with and accessible to the transportation management system 1260. In particular embodiments, ride requestor information may include profile information about a particular ride requestor 1201. In particular embodiments, the ride requestor 1201 may be associated with one or more categories or types, through which the ride requestor 1201 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 1260 may classify a user 1201 based on known information about the user 1201 (e.g., using machine-learning classifiers), and use the classification to retrieve relevant aggregate information associated with that class. For example, the system 1260 may classify a user 1201 as a young adult and retrieve relevant aggregate information associated with young adults, such as the type of music generally preferred by young adults.

Transportation management system 1260 may also store and access ride information. Ride information may include locations related to the ride, traffic data, route options, optimal pick-up or drop-off locations for the ride, or any other suitable information associated with a ride. As an example and not by way of limitation, when the transportation management system 1260 receives a request to travel from San Francisco International Airport (SFO) to Palo Alto, Calif., the system 1260 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 1260. For example, historical data may include aggregate information generated based on past ride information, which may include any ride information described herein and telemetry data collected by sensors in autonomous vehicles and/or user devices. Historical data may be associated with a particular user (e.g., that particular user's preferences, common routes, etc.), a category/class of users (e.g., based on demographics), and/or all users of the system 1260. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 1260 in particular embodiments may predict and provide ride suggestions in response to a ride request. In particular embodiments, the system 1260 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and/or semi-supervised learning based on a mixture of labeled and unlabeled training data.

In particular embodiments, transportation management system 1260 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 1260 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 1230 (which may belong to a ride requestor or provider), a transportation management system 1260, vehicle system 1240, or a third-party system 1270 to process, transform, manage, retrieve, modify, add, or delete the information stored in the data store.

In particular embodiments, transportation management system 1260 may include an authorization server (or any other suitable component(s)) that allows users 1201 to opt-in to or opt-out of having their information and actions logged, recorded, or sensed by transportation management system 1260 or shared with other systems (e.g., third-party systems 1270). In particular embodiments, a user 1201 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 1201 of transportation management system 1260 through blocking, data hashing, anonymization, or other suitable techniques as appropriate.

In particular embodiments, third-party system 1270 may be a network-addressable computing system that may provide HD maps or host GPS maps, customer reviews, music or content, weather information, or any other suitable type of information. Third-party system 1270 may generate, store, receive, and send relevant data, such as, for example, map data, customer review data from a customer review website, weather data, or any other suitable type of data. Third-party system 1270 may be accessed by the other computing entities of the network environment either directly or via network 1210. For example, user device 1230 may access the third-party system 1270 via network 1210, or via transportation management system 1260. In the latter case, if credentials are required to access the third-party system 1270, the user 1201 may provide such information to the transportation management system 1260, which may serve as a proxy for accessing content from the third-party system 1270.

In particular embodiments, user device 1230 may be a mobile computing device such as a smartphone, tablet computer, or laptop computer. User device 1230 may include one or more processors (e.g., CPU and/or GPU), memory, and storage. An operating system and applications may be installed on the user device 1230, such as, e.g., a transportation application associated with the transportation management system 1260, applications associated with third-party systems 1270, and applications associated with the operating system. User device 1230 may include functionality for determining its location, direction, or orientation, based on integrated sensors such as GPS, compass, gyroscope, or accelerometer. User device 1230 may also include wireless transceivers for wireless communication and may support wireless communication protocols such as Bluetooth, near-field communication (NFC), infrared (IR) communication, WI-FI, and/or 2G/3G/4G/LTE mobile communication standard. User device 1230 may also include one or more cameras, scanners, touchscreens, microphones, speakers, and any other suitable input-output devices.

In particular embodiments, the vehicle 1240 may be an autonomous vehicle and equipped with an array of sensors 1244, a navigation system 1246, and a ride-service computing device 1248. In particular embodiments, a fleet of autonomous vehicles 1240 may be managed by the transportation management system 1260. The fleet of autonomous vehicles 1240, in whole or in part, may be owned by the entity associated with the transportation management system 1260, or they may be owned by a third-party entity relative to the transportation management system 1260. In either case, the transportation management system 1260 may control the operations of the autonomous vehicles 1240, including, e.g., dispatching select vehicles 1240 to fulfill ride requests, instructing the vehicles 1240 to perform select operations (e.g., head to a service center or charging/fueling station, pull over, stop immediately, self-diagnose, lock/unlock compartments, change music station, change temperature, and any other suitable operations), and instructing the vehicles 1240 to enter select operation modes (e.g., operate normally, drive at a reduced speed, drive under the command of human operators, and any other suitable operational modes).

In particular embodiments, the autonomous vehicles 1240 may receive data from and transmit data to the transportation management system 1260 and the third-party system 1270. Examples of received data may include, e.g., instructions, new software or software updates, maps, 3D models, trained or untrained machine-learning models, location information (e.g., location of the ride requestor, the autonomous vehicle 1240 itself, other autonomous vehicles 1240, and target destinations such as service centers), navigation information, traffic information, weather information, entertainment content (e.g., music, video, and news) ride requestor information, ride information, and any other suitable information. Examples of data transmitted from the autonomous vehicle 1240 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 1240, passengers may send/receive data to the transportation management system 1260 and/or third-party system 1270), and any other suitable data.

In particular embodiments, autonomous vehicles 1240 may also communicate with each other as well as other traditional human-driven vehicles, including those managed and not managed by the transportation management system 1260. For example, one vehicle 1240 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) and/or over a network (e.g., the Internet or via the transportation management system 1260 or third-party system 1270).

In particular embodiments, an autonomous vehicle 1240 may obtain and process sensor/telemetry data. Such data may be captured by any suitable sensors. For example, the vehicle 1240 may have aa Light Detection and Ranging (LiDAR) sensor array of multiple LiDAR transceivers that are configured to rotate 360°, emitting pulsed laser light and measuring the reflected light from objects surrounding vehicle 1240. In particular embodiments, LiDAR transmitting signals may be steered by use of a gated light valve, which may be a MEMs device that directs a light beam using the principle of light diffraction. Such a device may not use a gimbaled mirror to steer light beams in 360° around the autonomous vehicle. Rather, the gated light valve may direct the light beam into one of several optical fibers, which may be arranged such that the light beam may be directed to many discrete positions around the autonomous vehicle. Thus, data may be captured in 360° around the autonomous vehicle, but no rotating parts may be necessary. A LiDAR is an effective sensor for measuring distances to targets, and as such may be used to generate a three-dimensional (3D) model of the external environment of the autonomous vehicle 1240. As an example and not by way of limitation, the 3D model may represent the external environment including objects such as other cars, curbs, debris, objects, and pedestrians up to a maximum range of the sensor arrangement (e.g., 50, 100, or 200 meters). As another example, the autonomous vehicle 1240 may have optical cameras pointing in different directions. The cameras may be used for, e.g., recognizing roads, lane markings, street signs, traffic lights, police, other vehicles, and any other visible objects of interest. To enable the vehicle 1240 to "see" at night, infrared cameras may be installed. In particular embodiments, the vehicle may be equipped with stereo vision for, e.g., spotting hazards such as pedestrians or tree branches on the road. As another example, the vehicle 1240 may have radars for, e.g., detecting other vehicles and/or hazards afar. Furthermore, the vehicle 1240 may have ultrasound equipment for, e.g., parking and obstacle detection. In addition to sensors enabling the vehicle 1240 to detect, measure, and understand the external world around it, the vehicle 1240 may further be equipped with sensors for detecting and self-diagnosing the vehicle's own state and condition. For example, the vehicle 1240 may have wheel sensors for, e.g., measuring velocity; global positioning system (GPS) for, e.g., determining the vehicle's current geolocation; and/or inertial measurement units, accelerometers, gyroscopes, and/or odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, an autonomous vehicle 1240 may build a 3D model of its surrounding based on data from its LiDAR, radar, sonar, and cameras, along with a pre-generated map obtained from the transportation management system 1260 or the third-party system 1270. Although sensors 1244 appear in a particular location on autonomous vehicle 1240 in FIG. 12, sensors 1244 may be located in any suitable location in or on autonomous vehicle 1240. Example locations for sensors include the front and rear bumpers, the doors, the front windshield, on the side panel, or any other suitable location.

In particular embodiments, the autonomous vehicle 1240 may be equipped with a processing unit (e.g., one or more CPUs and GPUs), memory, and storage. The vehicle 1240 may thus be equipped to perform a variety of computational and processing tasks, including processing the sensor data, extracting useful information, and operating accordingly. For example, based on images captured by its cameras and a machine-vision model, the vehicle 1240 may identify particular types of objects captured by the images, such as pedestrians, other vehicles, lanes, curbs, and any other objects of interest.

In particular embodiments, the autonomous vehicle 1240 may have a navigation system 1246 responsible for safely navigating the autonomous vehicle 1240. In particular embodiments, the navigation system 1246 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 1246 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 1246 may use its determinations to control the vehicle 1240 to operate in prescribed manners and to guide the autonomous vehicle 1240 to its destinations without colliding into other objects. Although the physical embodiment of the navigation system 1246 (e.g., the processing unit) appears in a particular location on autonomous vehicle 1240 in FIG. 12, navigation system 1246 may be located in any suitable location in or on autonomous vehicle 1240. Example locations for navigation system 1246 include inside the cabin or passenger compartment of autonomous vehicle 1240, near the engine/battery, near the front seats, rear seats, or in any other suitable location.

In particular embodiments, the autonomous vehicle 1240 may be equipped with a ride-service computing device 1248, which may be a tablet or any other suitable device installed by transportation management system 1260 to allow the user to interact with the autonomous vehicle 1240, transportation management system 1260, other users 1201, or third-party systems 1270. In particular embodiments, installation of ride-service computing device 1248 may be accomplished by placing the ride-service computing device 1248 inside autonomous vehicle 1240, and configuring it to communicate with the vehicle 1240 via a wire or wireless connection (e.g., via Bluetooth). Although FIG. 12 illustrates a single ride-service computing device 1248 at a particular location in autonomous vehicle 1240, autonomous vehicle 1240 may include several ride-service computing devices 1248 in several different locations within the vehicle. As an example and not by way of limitation, autonomous vehicle 1240 may include four ride-service computing devices 1248 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 1248 may be detachable from any component of autonomous vehicle 1240. This may allow users to handle ride-service computing device 1248 in a manner consistent with other tablet computing devices. As an example and not by way of limitation, a user may move ride-service computing device 1248 to any location in the cabin or passenger compartment of autonomous vehicle 1240, may hold ride-service computing device 1248, or handle ride-service computing device 1248 in any other suitable manner. Although this disclosure describes providing a particular computing device in a particular manner, this disclosure contemplates providing any suitable computing device in any suitable manner.

Figure 13:
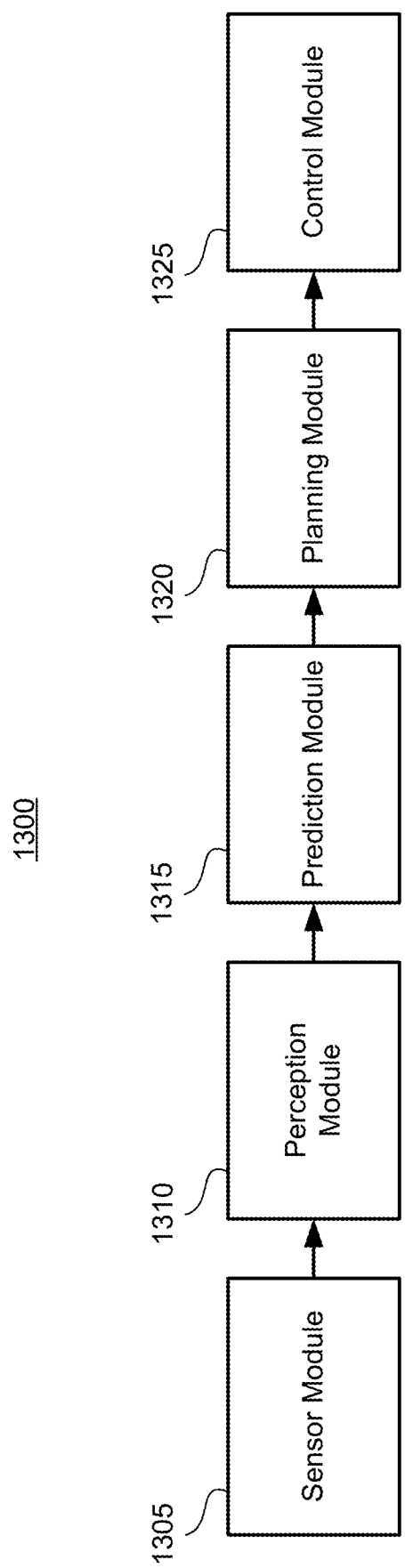
FIG. 13 illustrates an example block diagram of an algorithmic navigation pipeline.

FIG. 13 illustrates an example block diagram of an algorithmic navigation pipeline. In particular embodiments, an algorithmic navigation pipeline 1300 may include a number of computing modules, such as a sensor data module 1305, perception module 1310, prediction module 1315, planning module 1320, and control module 1325. Sensor data module 1305 may obtain and pre-process sensor/telemetry data that is provided to perception module 1310. Such data may be captured by any suitable sensors of a vehicle. As an example and not by way of limitation, the vehicle may have a Light Detection and Ranging (LiDAR) sensor that is configured to transmit pulsed laser beams in multiple directions and measure the reflected signal from objects surrounding a vehicle. The time of flight of the light signals may be used to measure the distance or depth of the objects from the LiDAR. As another example, the vehicle may have optical cameras pointing in different directions to capture images of the vehicle's surroundings. Radars may also be used by the vehicle for detecting other vehicles and/or hazards at a distance. As further examples, the vehicle may be equipped with ultrasound for close range object detection, e.g., parking and obstacle detection or infrared cameras for object detection in low-light situations or darkness. In particular embodiments, sensor data module 1305 may suppress noise in the sensor data or normalize the sensor data.

Perception module 1310 is responsible for correlating and fusing the data from the different types of sensors of the sensor data module 1305 to model the contextual environment of the vehicle. Perception module 1310 may use information extracted by multiple independent sensors to provide information that would not be available from any single type of sensors. Combining data from multiple sensor types allows the perception module 1310 to leverage the strengths of different sensors and more accurately and precisely perceive the environment. As an example and not by way of limitation, image-based object recognition may not work well in low-light conditions. This may be compensated by sensor data from LiDAR or radar, which are effective sensors for measuring distances to targets in low-light conditions. As another example, image-based object recognition may mistakenly determine that an object depicted in a poster is an actual three-dimensional object in the environment. However, if depth information from a LiDAR is also available, the perception module 1310 could use that additional information to determine that the object in the poster is not, in fact, a three-dimensional object.

Perception module 1310 may process the available data (e.g., sensor data, data from a high-definition map, etc.) to derive information about the contextual environment. For example, perception module 1310 may include one or more agent modelers (e.g., object detectors, object classifiers, or machine-learning models trained to derive information from the sensor data) to detect and/or classify agents present in the environment of the vehicle (e.g., other vehicles, pedestrians, moving objects). Perception module 1310 may also determine various characteristics of the agents. For example, perception module 1310 may track the velocities, moving directions, accelerations, trajectories, relative distances, or relative positions of these agents. In particular embodiments, the perception module 1310 may also leverage information from a high-definition map. The high-definition map may include a precise three-dimensional model of the environment, including buildings, curbs, street signs, traffic lights, and any stationary fixtures in the environment. Using the vehicle's GPS data and/or image-based localization techniques (e.g., simultaneous localization and mapping, or SLAM), the perception module 1310 could determine the pose (e.g., position and orientation) of the vehicle or the poses of the vehicle's sensors within the high-definition map. The pose information, in turn, may be used by the perception module 1310 to query the high-definition map and determine what objects are expected to be in the environment.

Perception module 1310 may use the sensor data from one or more types of sensors and/or information derived therefrom to generate a representation of the contextual environment of the vehicle. As an example and not by way of limitation, the representation of the external environment may include objects such as other vehicles, curbs, debris, objects, and pedestrians. The contextual representation may be limited to a maximum range of the sensor array (e.g., 50, 100, or 200 meters). The representation of the contextual environment may include information about the agents and objects surrounding the vehicle, as well as semantic information about the traffic lanes, traffic rules, traffic signs, time of day, weather, and/or any other suitable information. The contextual environment may be represented in any suitable manner. As an example and not by way of limitation, the contextual representation may be encoded as a vector or matrix of numerical values, with each value in the vector/matrix corresponding to a predetermined category of information. For example, each agent in the environment may be represented by a sequence of values, starting with the agent's coordinate, classification (e.g., vehicle, pedestrian, etc.), orientation, velocity, trajectory, and so on. Alternatively, information about the contextual environment may be represented by a raster image that visually depicts the agent, semantic information, etc. For example, the raster image may be a birds-eye view of the vehicle and its surrounding, up to a predetermined distance. The raster image may include visual information (e.g., bounding boxes, color-coded shapes, etc.) that represent various data of interest (e.g., vehicles, pedestrians, lanes, buildings, etc.).

The representation of the present contextual environment from the perception module 1310 may be consumed by a prediction module 1315 to generate one or more predictions of the future environment. For example, given a representation of the contextual environment at time $t_0$, the prediction module 1315 may output another contextual representation for time $t_1$. For instance, if the $t_0$ contextual environment is represented by a raster image, the output of the prediction module 1315 may be another raster image (e.g., a snapshot of the current environment) that depicts where the agents would be at time $t_1$ (e.g., a snapshot of the future). In particular embodiments, prediction module 1315 may include a machine-learning model (e.g., a convolutional neural network, a neural network, a decision tree, support vector machines, etc.) that may be trained based on previously recorded contextual and sensor data. For example, one training sample may be generated based on a sequence of actual sensor data captured by a vehicle at times to and $t_1$. The captured data at times $t_0$ and $t_1$ may be used to generate, respectively, a first contextual representation (the training data) and a second contextual representation (the associated ground-truth used for training). During training, the machine-learning model may process the first contextual representation using the model's current configuration parameters and output a predicted contextual representation. The predicted contextual representation may then be compared to the known second contextual representation (i.e., the ground-truth at time $t_1$). The comparison may be quantified by a loss value, computed using a loss function. The loss value may be used (e.g., via back-propagation techniques) to update the configuration parameters of the machine-learning model so that the loss would be less if the prediction were to be made again. The machine-learning model may be trained iteratively using a large set of training samples until a convergence or termination condition is met. For example, training may terminate when the loss value is below a predetermined threshold. Once trained, the machine-learning model may be used to generate predictions of future contextual representations based on current contextual representations.

Planning module 1320 may determine the navigation routes and particular driving operations (e.g., slowing down, speeding up, stopping, swerving, etc.) of the vehicle based on the predicted contextual representation generated by the prediction module 1315. In particular embodiments, planning module 1320 may utilize the predicted information encoded within the predicted contextual representation (e.g., predicted location or trajectory of agents, semantic data, etc.) and any other available information (e.g., map data, traffic data, accident reports, weather reports, target destinations, and any other suitable information) to determine one or more goals or navigation instructions for the vehicle. As an example and not by way of limitation, based on the predicted behavior of the agents surrounding the vehicle and the traffic data to a particular destination, planning module 1320 may determine a particular navigation path and associated driving operations for the vehicle to avoid possible collisions with one or more agents.

In particular embodiments, planning module 1320 may generate, based on a given predicted contextual representation, several different plans (e.g., goals or navigation instructions) for the vehicle. For each plan, the planning module 1320 may compute a score that represents the desirability of that plan. For example, if the plan would likely result in the vehicle colliding with an agent at a predicted location for that agent, as determined based on the predicted contextual representation, the score for the plan may be penalized accordingly. Another plan that would cause the vehicle to violate traffic rules or take a lengthy detour to avoid possible collisions may also have a score that is penalized, but the penalty may be less severe than the penalty applied for the previous plan that would result in a collision. A third plan that causes the vehicle to simply stop or change lanes to avoid colliding with the agent in the predicted future may receive the highest score. Based on the assigned scores for the plans, the planning module 1320 may select the best plan to carry out. While the example above used collision as an example, the disclosure herein contemplates the use of any suitable scoring criteria, such as travel distance or time, fuel economy, changes to the estimated time of arrival at the destination, passenger comfort, proximity to other vehicles, the confidence score associated with the predicted contextual representation, etc.

Based on the plan generated by planning module 1320, which may include one or more navigation path or associated driving operations, control module 1325 may determine the specific commands to be issued to the actuators of the vehicle. The actuators of the vehicle are components that are responsible for moving and controlling the vehicle. The actuators control driving functions of the vehicle, such as for example, steering, turn signals, deceleration (braking), acceleration, gear shift, etc. As an example and not by way of limitation, control module 1325 may transmit commands to a steering actuator to maintain a particular steering angle for a particular amount of time to move a vehicle on a particular trajectory to avoid agents predicted to encroach into the area of the vehicle. As another example, control module 1325 may transmit commands to an accelerator actuator to have the vehicle safely avoid agents predicted to encroach into the area of the vehicle.

Figure 14:
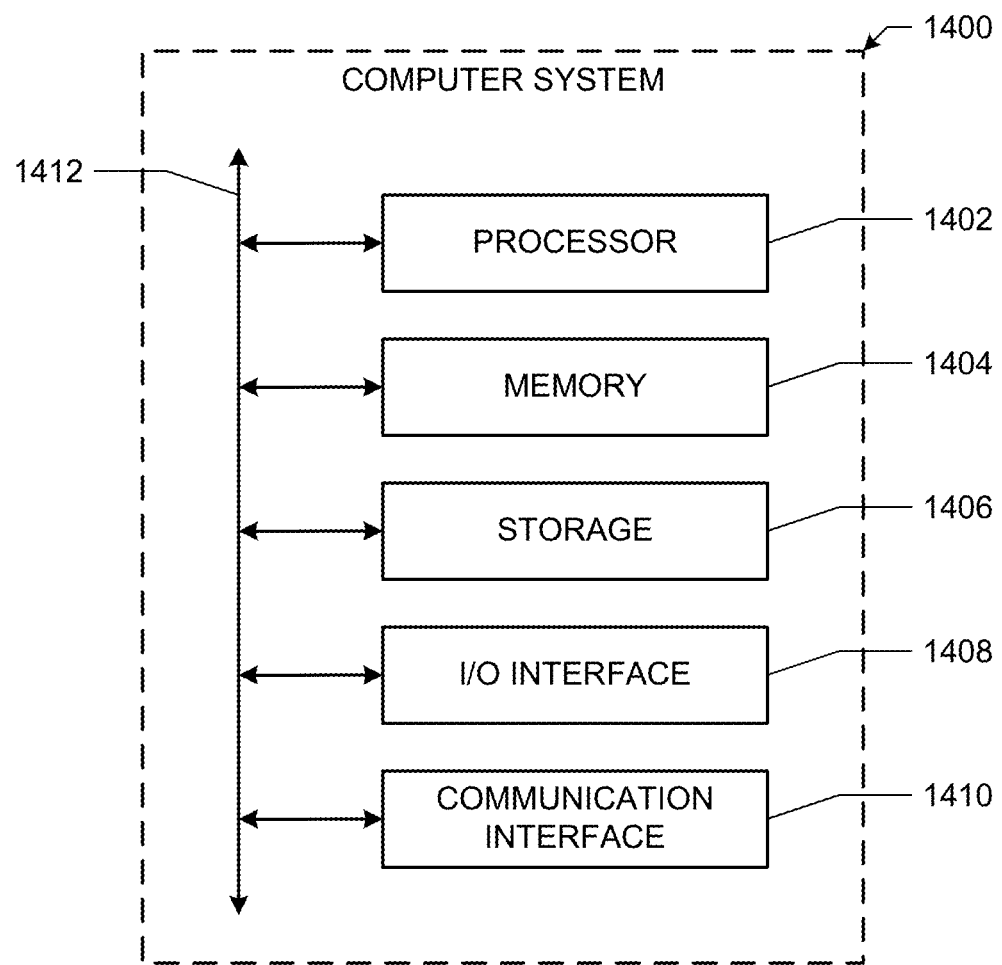
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide the functionalities described or illustrated herein. In particular embodiments, software running on one or more computer systems 1400 performs one or more steps of one or more methods described or illustrated herein or provides the functionalities described or illustrated herein. Particular embodiments include one or more portions of one or more computer systems 1400. Herein, a reference to a computer system may encompass a computing device, and vice versa, where appropriate. Moreover, a reference to a computer system may encompass one or more computer systems, where appropriate.

This disclosure contemplates any suitable number of computer systems 1400. This disclosure contemplates computer system 1400 taking any suitable physical form. As an example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 that are to be operated on by computer instructions; the results of previous instructions executed by processor 1402 that are accessible to subsequent instructions or for writing to memory 1404 or storage 1406; or any other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs), be a multi-core processor, or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described in further detail below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system associated with a vehicle:
    receiving sensor data of an environment of the vehicle generated by one or more sensors of the vehicle, the sensors comprising a camera;
    identifying, based on the sensor data, one or more objects in a field of view of the camera and one or more object types that correspond to the one or more objects;
    determining one or more target histograms that correspond to the one or more object types;
    generating a processed image based on an image captured by the camera, wherein the processed image has a histogram based on the one or more target histograms; and
    using the processed image to determine state information associated with the one or more objects.

2. The method of claim 1, wherein the processed image is generated by processing the image captured by the camera using a histogram matching algorithm to generate the histogram of the processed image based on the one or more target histograms.

3. The method of claim 1, wherein each of the one or more target histograms comprises a plurality of target counts corresponding to a plurality of brightness values, and each target count indicates how many pixels are associated with the corresponding brightness value, and
    wherein the processed image comprises a second plurality of pixels having brightness values based on the target counts.

4. The method of claim 3, wherein a distribution of the brightness values of the second plurality of pixels matches a distribution of brightness values determined from the one or more target histograms.

5. The method of claim 3, wherein color values of the second plurality of pixels are based on color values of corresponding pixels of the image captured by the camera.

6. The method of claim 1, wherein generating the processed image comprises:
    sending a request to a camera system of the vehicle to capture the image and generate the processed image based on the one or more target histograms and on the image; and
    receiving the processed image from the camera system, wherein the histogram of the processed image received from the camera system matches the one or more target histograms.

7. The method of claim 6, wherein generating the processed image further comprises determining one or more camera settings based on the one or more target histograms, the request to the camera system comprises the one or more camera settings, and the one or more camera settings comprise one of an exposure duration and a gain.

8. The method of claim 1, wherein using the processed image to determine state information associated with the one or more objects comprises determining one or more characteristics of the one or more objects using a perception system, and the characteristics comprise one of velocities, moving directions, accelerations, trajectories, relative distances, and relative positions of the objects.

9. The method of claim 1, wherein the one or more objects are identified based on a geographical location of the vehicle and map data comprising information about the locations of the one or more objects, and the geographical location of the vehicle is determined using one of LiDAR and an Inertial Measurement Unit (IMU).

10. The method of claim 1, wherein identifying the one or more objects comprises:
    determining a location and orientation of the vehicle in relation to a semantic map;
    wherein the one or more objects are represented in the semantic map and, when projected to the image captured by the camera according to a coordinate transformation and the location of the vehicle relative to the semantic map, are in the field of view of the camera, and
    wherein the one or more object types are identified based on an association in the semantic map between the objects and the object types.

11. The method of claim 1, wherein the one or more objects are identified by processing the image using an object detection algorithm, and the object detection algorithm identifies the one or more object types that correspond to the one or more objects.

12. The method of claim 1, wherein the one or more objects comprise a plurality of identified objects, the one or more target histograms comprise a plurality of target histograms, and the histogram based on the one or more target histograms comprises a candidate histogram for which a difference between the candidate histogram and the plurality of target histograms is minimized across the plurality of target histograms.

13. The method of claim 1, wherein the one or more objects comprise a plurality of objects, the one or more target histograms comprise a plurality of target histograms, and generating the processed image comprises:
identifying a plurality of object priorities that correspond to the plurality of objects;
determining a plurality of threshold true-positive rates that correspond to the plurality of objects based on the object priorities that correspond to the objects; and
determining a plurality of threshold histogram-deviation rates that correspond to the objects based on a mapping from the threshold true-positive rates to the corresponding threshold histogram-deviation rates,
wherein the histogram based on the one or more target histograms comprises a histogram that, for each of the objects, differs from the corresponding target histogram by less than the corresponding threshold histogram-deviation rate.

14. The method of claim 1, further comprising:
accessing a plurality of second images that represent a plurality of vehicle environments, wherein each second image depicts one or more second objects, and the one or more second objects correspond to one or more second object types;
for each second image, generating a plurality of candidate images having corresponding candidate histograms, wherein the candidate images are generated based on a range of camera setting values, each range of camera setting values comprising at least a minimum value and a maximum value; and
for each of the second object types:
determining a performance assessment of an object detection machine-learning model for the second object type based on performance of the model in detecting one or more of the second objects of the second object type in one or more of the candidate images generated from particular camera setting values, wherein the performance assessment comprises one of a true-positive rate and a false-positive rate,
selecting a target histogram from the candidate histograms based on the assessment of performance of the model in detecting objects of the second object type, and
storing the target histogram in association with the second object type.

15. The method of claim 14, further comprising:
for each second image, determining one or more bounded regions, wherein each bounded region includes a corresponding second object, and
wherein determining the performance assessment of the object detection machine-learning model for the second object type is based on performance of the model in detecting one or more of the second objects of the second object type in the bounded regions that correspond to the second object.

16. The method of claim 14, wherein determining the performance assessment of the object detection machine-learning model for the second object type is based on performance of the model in detecting one or more of the second objects in a test region that does not contain any of the second objects, wherein the performance assessment comprises one of a true-negative rate, and a false-negative rate.

17. The method of claim 1, further comprising:
determining a location of the sun or one or more sun-related effects in the field of view of the camera based on one of a time of day, a geographic location associated with the image, and a camera orientation associated with the image;
identifying a region of the image comprising the sun or the sun-related effects based on the location of the sun in the field of view of the camera; and
excluding a region of the image comprising the sun or the sun-related effects from the image when generating the processed image.

18. The method of claim 17, wherein excluding the region of the image comprises:
generating an updated histogram of the image, wherein the updated histogram is not based on the region of the image comprising the sun or the sun-related effects,
wherein the processed image is generated by processing the image and the updated histogram of the image using a histogram matching algorithm to generate the histogram of the processed image based on the one or more target histograms.

19. A system comprising: a processor and a computer-readable non-transitory storage media coupled to the processor, the computer-readable non-transitory storage media comprising instructions operable when executed by the processor to cause the system to:
receive sensor data generated by a sensor of a vehicle of an environment of the vehicle;
identify a type of object in a field of view of a camera of the vehicle based upon at least one of:
a location and an orientation of the vehicle in a semantic map; or
the sensor data;
identify a target histogram based upon the type of the object, wherein the target histogram comprises a distribution of parameters of pixels;
generate a processed image based on an image captured by the camera and the target histogram; and
determine state information associated with the object based upon the processed image.

20. A computer-readable non-transitory storage media embodying software that is operable when executed to cause a processor to perform operations comprising:
receiving sensor data generated by a sensor of a vehicle of an environment of the vehicle;
identifying a type of object in a field of view of a camera of the vehicle based upon at least one of:
a location and an orientation of the vehicle in a semantic map; or
the sensor data;
identifying a target histogram based upon the type of the object, wherein the target histogram comprises a distribution of parameters of pixels;
generating a processed image based on an image captured by the camera and the target histogram; and
determining state information associated with the object based upon the processed image.

* * * * *